(12) United States Patent
Nandakumar

(10) Patent No.: US 8,695,071 B2
(45) Date of Patent: Apr. 8, 2014

(54) AUTHENTICATION METHOD

(76) Inventor: Gopal Nandakumar, San Antonio, TX (US)

( * ) Notice: Subject to any disclaimer, the term of this patent is extended or adjusted under 35 U.S.C. 154(b) by 0 days.

(21) Appl. No.: 13/279,296

(22) Filed: Oct. 23, 2011

(65) Prior Publication Data
US 2013/0104213 A1 Apr. 25, 2013

(51) Int. Cl.
G06F 7/04 (2006.01)
(52) U.S. Cl.
USPC .............. 726/7; 726/2; 705/18; 713/155
(58) Field of Classification Search
None
See application file for complete search history.

(56) References Cited

U.S. PATENT DOCUMENTS

| | | | |
|---|---|---|---|
| 7,111,322 B2 * | 9/2006 | Slick et al. .................. 726/5 |
| 7,437,145 B2 * | 10/2008 | Hamada .................. 455/410 |
| 8,132,255 B2 | 3/2012 | Mates | |
| 8,141,146 B2 * | 3/2012 | Ozeki ...................... 726/21 |
| 2001/0047281 A1 | 11/2001 | Keresman, III et al. | |
| 2002/0070964 A1 * | 6/2002 | Botz et al. ................ 345/741 |
| 2005/0041805 A1 * | 2/2005 | Rosen et al. ............. 380/200 |
| 2005/0273624 A1 | 12/2005 | Serpa | |
| 2007/0175978 A1 | 8/2007 | Stambaugh | |
| 2007/0192618 A1 | 8/2007 | Ellmore | |
| 2007/0204016 A1 | 8/2007 | Kunz et al. | |
| 2008/0066165 A1 | 3/2008 | Rosenoer | |
| 2008/0098464 A1 * | 4/2008 | Mizrah ...................... 726/5 |
| 2008/0250477 A1 * | 10/2008 | Samuelsson et al. ........ 726/4 |
| 2009/0063850 A1 * | 3/2009 | Joram et al. ............. 713/155 |
| 2009/0106825 A1 * | 4/2009 | Cerruti et al. ............. 726/5 |
| 2009/0259588 A1 * | 10/2009 | Lindsay ..................... 705/40 |
| 2010/0217975 A1 * | 8/2010 | Grajek et al. ............ 713/157 |
| 2010/0241595 A1 * | 9/2010 | Felsher .................... 705/400 |
| 2010/0251388 A1 * | 9/2010 | Dorfman ................... 726/29 |
| 2011/0041165 A1 * | 2/2011 | Bowen ....................... 726/5 |
| 2011/0107092 A1 * | 5/2011 | Krig ......................... 713/168 |
| 2011/0314529 A1 * | 12/2011 | Bailey, Jr. .................. 726/7 |
| 2011/0321125 A1 * | 12/2011 | Kyohgoku et al. ........... 726/2 |
| 2012/0054833 A1 * | 3/2012 | Albisu ........................ 726/4 |
| 2012/0144461 A1 * | 6/2012 | Rathbun ..................... 726/5 |
| 2012/0144468 A1 * | 6/2012 | Pratt et al. .................. 726/7 |
| 2012/0151567 A1 * | 6/2012 | Chayanam et al. .......... 726/7 |
| 2012/0239928 A1 * | 9/2012 | Judell ....................... 713/168 |

OTHER PUBLICATIONS

U.S. Appl. No. 13/279,287, filed Oct. 23, 2011 by Gopal Nandakumar (maintained in IFW system).
U.S. Appl. No. 13/279,288, filed Oct. 23, 2011 by Gopal Nandakumar (maintained in IFW system).

(Continued)

*Primary Examiner* — Fikremariam A Yalew
*Assistant Examiner* — Khoi Le

(57) ABSTRACT

A system and method whereby the identity of a person, entity, device or the like attempting to gain access to a secured resource may be securely authenticated includes a means for receiving from a service client (such as a retail store, service station, on-line service provider or merchandiser, healthcare provider, medical insurer, information consumer or the like) a request for access to a secured resource, where the request for access was previously submitted to the service client by a requester purporting to be an authorized user of said secured resource; means for generating and communicating to the purported authorized user a challenge string adapted to provide a basis for authenticating the identity of the requester; a means for receiving from the service client a response string corresponding to the challenge string; and a means for evaluating the response string to authenticate the identity of the requester.

18 Claims, 16 Drawing Sheets

(56) References Cited

OTHER PUBLICATIONS

U.S. Appl. No. 13/279,289, filed Oct. 23, 2011 by Gopal Nandakumar (maintained in IFW system).
U.S. Appl. No. 13/279,290, filed Oct. 23, 2011 by Gopal Nandakumar (maintained in IFW system).
U.S. Appl. No. 13/279,292, filed Oct. 23, 2011 by Gopal Nandakumar (maintained in IFW system).
U.S. Appl. No. 13/279,293, filed Oct. 23, 2011 by Gopal Nandakumar (maintained in IFW system).
U.S. Appl. No. 13/279,294, filed Oct. 23, 2011 by Gopal Nandakumar (maintained in IFW system).
U.S. Appl. No. 13/279,295, filed Oct. 23, 2011 by Gopal Nandakumar (maintained in IFW system).
U.S. Appl. No. 13/279,297, filed Oct. 23, 2011 by Gopal Nandakumar (maintained in IFW system).

* cited by examiner

AUTHENTICATION METHOD

FIELD OF THE INVENTION

The present invention relates to security protocols for use in securing and/or restricting access to personal other confidential information, physical locations and the like. More particularly, the invention relates to a method whereby the identity of a person, entity, device or the like attempting to gain access to a secured resource may be securely authenticated.

BACKGROUND OF THE INVENTION

The protection of personal information and/or other secured resources, such as, for example, credit data, medical history, financial account information, secured physical locations and the like is of ever increasing concern to businesses and individuals alike. To be sure, each passing day reveals more sophisticated attacks by those who would gain unauthorized access to such resources absent the constant vigilance of those charged with the protection of such resources. To this end, the various security protocols employed for the protection of such resources almost universally includes some means for authenticating the identity of a person, entity, device or the like attempting to gain access to a secured resource.

More often than not the critical authentication is carried out by the age old process of a providing a privately held password, personal identification number or the like in connection with some generally publicly known identifier for the person, entity, device or the like attempting to gain access to the secured resource. Unfortunately, however, this protocol is dogged by vulnerability to interception through spoofing, eavesdropping, and countless other techniques though which a password, personal identification number or the like may become known to an attacker. Additionally, it is common to find that a single person, entity, device or the like uses the same password, personal identification number or the like in connection with gaining access to multiple secured resources. In such case, a security breach in connection with a single secured resource may jeopardize the security of all other secured resources.

Giving the fundamentally flawed state of the art with respect to password type protection, it is therefore the overriding object of the present invention to improve over the prior art by providing a method by which authentication may be more securely conducted. Additionally, it is an object of the present invention to provide such a method that is robust in specific implementation and readily usable by any manner of person, entity, device or the like. Finally, it is an object of the present invention to provide such a method that is economical in implementation and therefore readily accessible to virtually any application.

SUMMARY OF THE INVENTION

In accordance with the foregoing objects, the present invention—an authentication method for authenticating the identity of a requester of access to a secured resource—generally comprises the steps of receiving from a service client (such as, for example, a retail store, a service station, an on-line service provider or merchandiser, a healthcare provider, a medical insurer, an information consumer or the like) a request for access to a secured resource, where the request for access was previously submitted to the service client by a requester purporting to be an authorized user of the secured resource; generating and communicating to the purported authorized user a challenge string adapted to provide a basis for authenticating the identity of the requester; receiving from the service client a response string corresponding to the challenge string; and evaluating the response string to authenticate the identity of the requester.

In at least some implementations of the present invention, the authentication method further comprises the step of evaluating the response string to determine whether as a result of passage of time the response string should be deemed to be invalid regardless of content.

In at least some implementations of the present invention, the authentication method further comprises the step of establishing a test adapted to detect the existence of a spoofing type deception and in at least some embodiments of these implementations the test may also be adapted to at least in part authenticate the identity of the requester.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 5 shows, in a deployment diagram comprising FIGS. 5A and 5B, an exemplary hardware and software implementation of the authentication system and method of the present invention, and wherein:

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
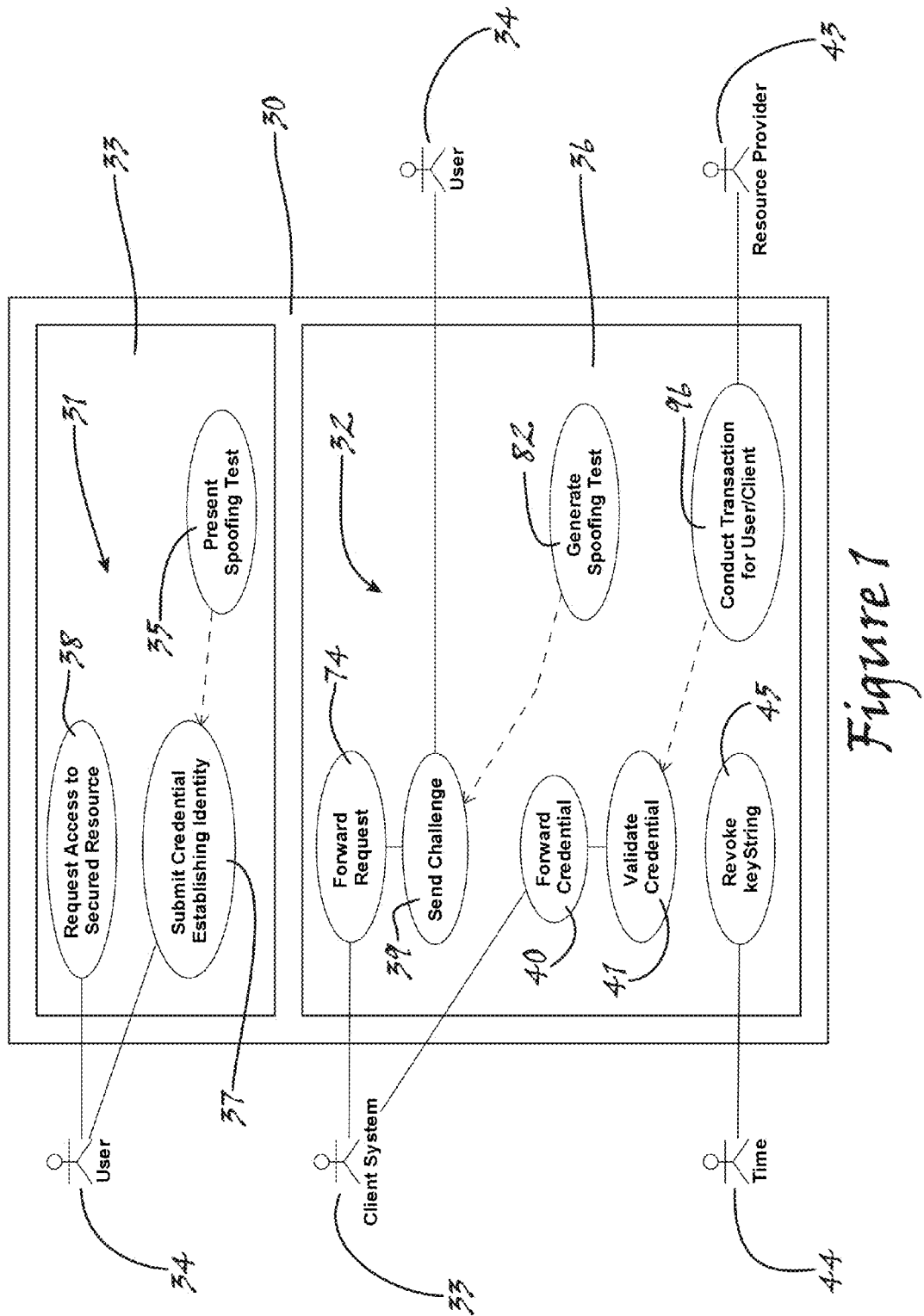
FIG. 1 shows, in an overview use case diagram, the various basic functionality implemented in the preferred embodiment of the authentication system and method of the present invention.

Referring now to the figures, and to FIG. 1 in particular, the authentication system 30 of the present invention is shown to generally comprise an operative combination of a plurality of service client implemented use cases 31 and a plurality of service provider implemented use cases 32. In particular, the service client 33 of the present invention will generally provide for an end user actor 34 a means 38 for requesting access to a secured resource and, additionally, a means 37 for submitting an authentication credential for use in validating the purported access right of the end user actor 34. In an extension of the present invention particularly useful in implementations comprising an Internet website-based or other client user interface 105 generally susceptible to spoofing type deceptions, the service client 33 may in combination with the means 37 for submitting an authentication credential also be adapted to provide for the end user actor 34 a means 35 for detecting the existence of a spoofing type deception.

As also particularly shown in FIG. 1, the service provider 36 of the present invention will generally provide for a service client actor 33 a means 74 for forwarding an end user actor submitted request for access to a secured resource to the service provider 36 and, additionally, a means 40 for forwarding an end user provided authentication credential to the service provider 36. Additionally, the service provider 36 of the present invention will generally provide responsive to the forwarding by a service client actor 33 of an end user submitted request for access to a secured resource a means 39 for generating and sending to an end user actor 34 a challenge message 94 designed to enable only the intended end user actor 34 to determine the content of a transient authentication credential. Still further, the service provider 36 of the present invention will generally provide responsive to the forwarding by a service client actor 33 of an end user submitted authentication credential a means 41 for validating the authentication credential.

In a further aspect of the extension of the present invention previously discussed as being particularly useful in implementations comprising an Internet website-based or other client user interface 105 generally susceptible to spoofing type deceptions, the service provider 36 may in combination with the means 39 for generating and sending to an end user actor 34 a challenge message 94 also be adapted to provide a means 82 for generating content for use in the means for detecting the existence of a spoofing type deception and to provide such content to the end user actor 34 as well as to the service client actor 33.

In a further extension of the present invention particularly useful in the most typical implementations of the present invention wherein for security or other reasons the service client 33 is unable to directly access features or functionality of a resource for which an end user actor 34 has requested access, the service provider 36 is also adapted to provide for the end user actor 34 and/or the service client actor 33 a means 96 for conducting a transaction reliant upon or otherwise in connection with the requested secured resource. In this case, it is noted that the secured resource may be provided by and/or otherwise under the further control of a resource provider actor 43 external to the service provider 36 or, in the alternative, may be provided and/or implemented by and/or otherwise under the control of the service provider 36. In any event, the means 96 for conducting a transaction reliant upon or otherwise in connection with the requested secured resource may generally also further comprise a means for reporting the conducted transaction to the service client actor 33 and/or the end user actor 34.

Finally, it is noted that time 44 as an actor may be accommodated as desired in any particular implementation wherein the service provider 36 is also provided with means 45 responsive to the passage of time for revoking or otherwise invalidating an authentication credential such that an authentication credential otherwise correctly determined by an end user actor 34 in response to a service provider generated challenge message 94 may as a result of the passage of time be deemed to be incorrect, thereby resulting in a validation failure upon application of the means 45 for validating the authentication credential.

Figure 2:
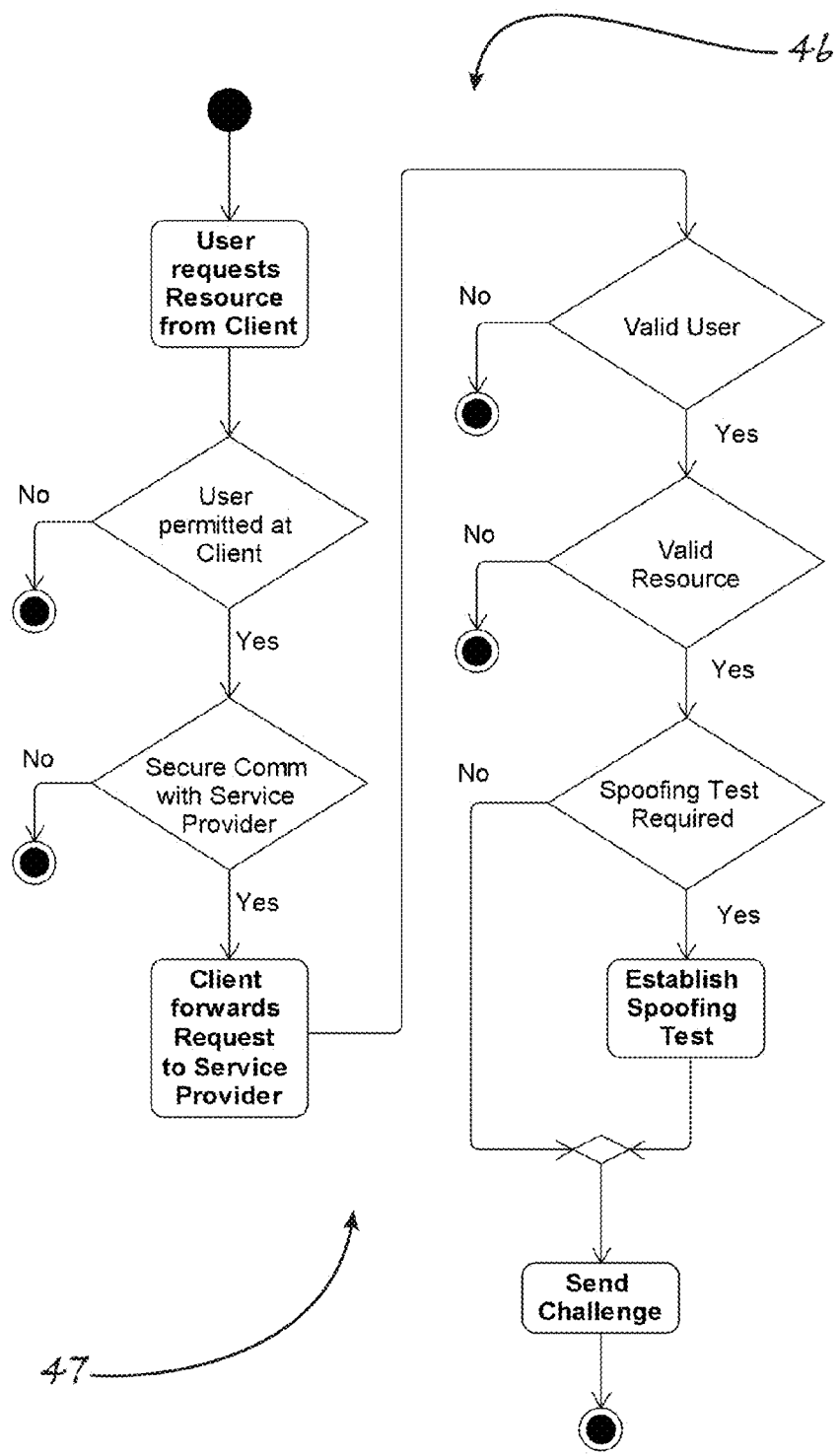
FIG. 2 shows, in a flowchart, an overview of the various steps generally taken in making a request for access to a secured resource in accordance with the present invention.
Figure 3:
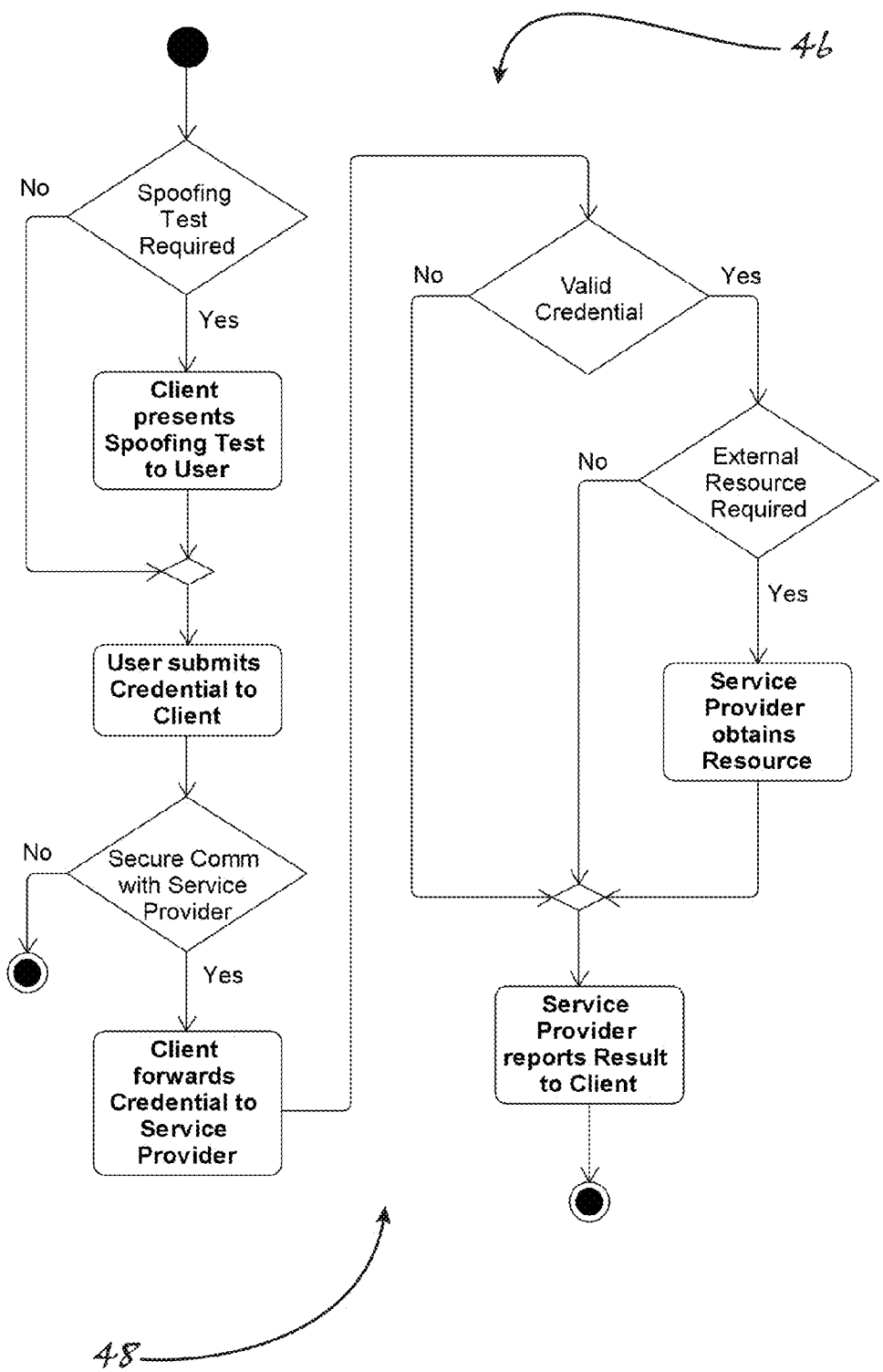
FIG. 3 shows, in a flowchart, an overview of the various steps generally taken in validating the purported access right of a user requesting access to a secured resource in accordance with the present invention.
Figure 4:
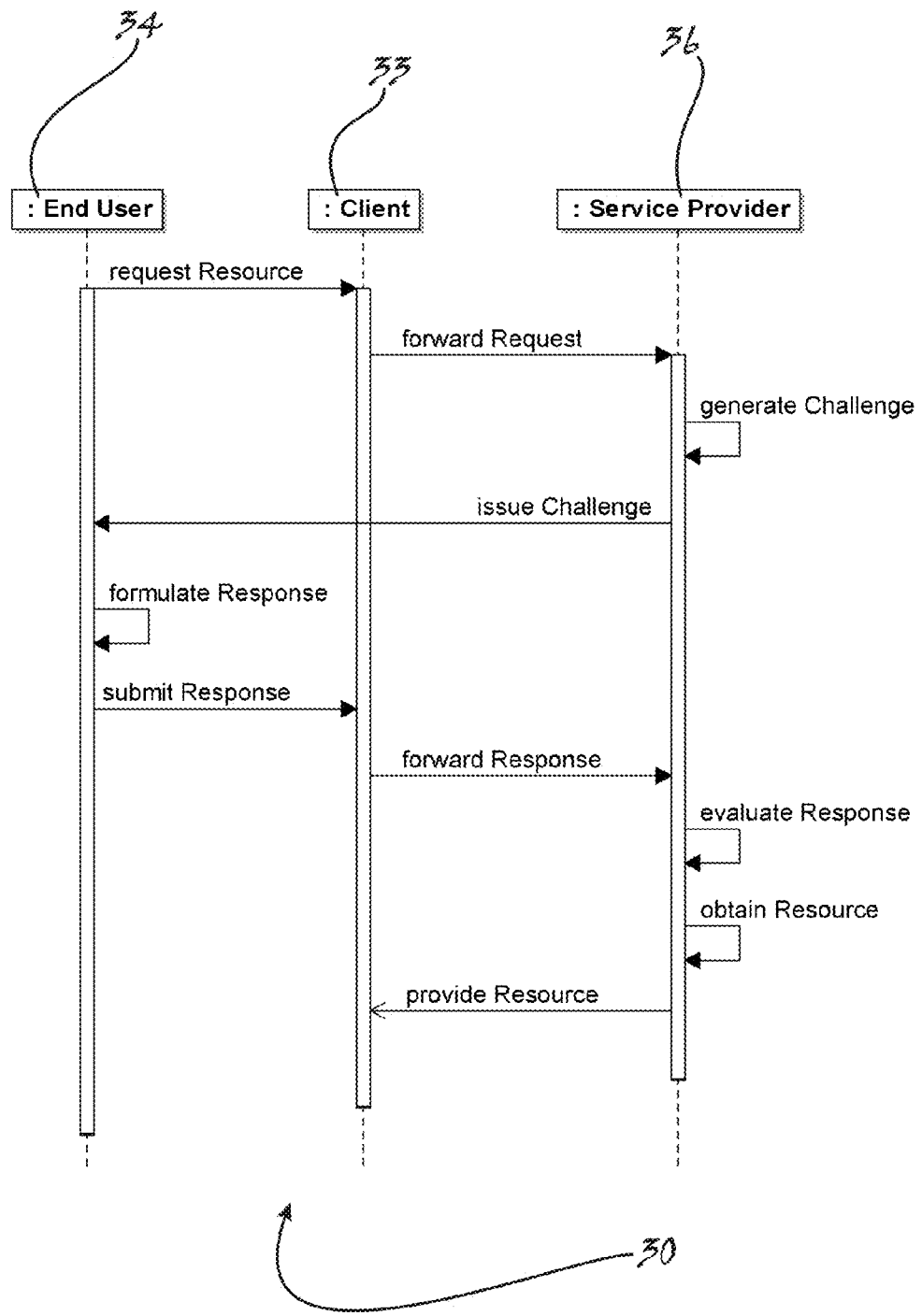
FIG. 4 shows, in an overview sequence diagram, various interactions as generally take place during the operation of the authentication system and method of the present invention.

Referring now then to FIGS. 2 through 4 in particular, the authentication method 46 of the present invention as operative upon the described authentication system 30 is shown to generally comprise various series of interactions between an end user 34, a service client system 33 and a service provider system 36, as broadly set out in FIG. 4, wherein the interactions may be broadly categorized as steps 47 implicated in requesting access to a secured resource, as broadly set out in FIG. 2, and steps 48 implicated in validating the purported access right of the user requesting access to the secured resource, as broadly set out in FIG. 3.

As particularly shown in FIGS. 2 and 4, the authentication method 46 of the present invention generally begins with an end user 34 submitting or otherwise making through a service client 33 a request for access to a secured resource, which end user submitted request is then forwarded by the service client 33 to the service provider 36. Although generally considered to be an optional feature of the present invention, it is noted that prior to forwarding the end user submitted request to the service provider 36 the service client 33 may, if desired, first determine whether the end user 34 making the request is authorized or otherwise permitted to make such use of the service client system 33. If in an implementation of this feature it is determined that the end user 34 is not authorized or otherwise permitted to make the attempted use of the service client system 33 the instigated process 47 will generally terminate whereas if it is determined that the end user 34 is authorized or otherwise permitted to make the attempted use of the service client system 33 the process 47 will generally continue. In any case, in an additional also optional but most preferred feature of the present invention, the service client systems 33 may be programmed or otherwise configured to ensure prior to forwarding the end user submitted request to the service provider 36 that a secure communication channel is first established between the service client 33 and the service provider 36. If in an implementation of this feature the required secure communication channel cannot be established between the service client 33 and the service provider 36 the continuing process 47 will generally terminate whereas if the required secure communication channel is successfully established between the service client 33 and the service provider 36 the process 47 will generally continue.

In any case, once an end user submitted request is forwarded by the service client 33 to the service provider 36 the remaining processing of the request is conducted by the service provider 36. In particular, once the forwarded request is received by the service provider 36, the service provider 36 preferably determines whether the end user 34 making the request is authorized or otherwise permitted to make such use of the authentication system 30. If in an implementation of this feature it is determined that the end user 34 is not authorized or otherwise permitted to make the attempted use of the authentication system 30 the process 47 will generally terminate whereas if it is determined that the end user 34 is authorized or otherwise permitted to make the attempted use of the authentication system 30 the process 47 will generally continue. In any case, it is noted that in an important aspect of the present invention the service provider 36 must be able to evaluate the service client forwarded request to determine the specific identity of the resource for which the request is made. To this end, as will be better understood further herein, the forwarded request preferably comprises at least the common identifier for the resource. In any case, if the available information is insufficient for the service provider 36 to positively determine the identity of the resource for which the end user 34 has requested access the process 47 will generally terminate whereas if the available information is sufficient for the service provider 36 to positively determine the identity of the resource for which the end user 34 has requested access the process 47 will generally continue.

In the final steps for processing 47 an end user submitted request for access to a secured resource, the service provider 36 generates a challenge message 94 designed to enable only an authorized end user 34 to determine the content of a transient authentication credential and, thereafter, issues the challenge message 94 to the end user 34. In connection with the step of generating the challenge message 94, however, and as a predicate to the step of issuing the challenge message 94, a service provider system 36 implemented as part of an authentication system 30 that also comprises a means 35 for detecting the existence of a spoofing type deception must be adapted to determine whether under the circumstances of the particular in process request for access to a secured resource such a means 35 for detecting the existence of a spoofing type deception should be deployed. If in such an implementation it is determined that no test for detecting the existence of a spoofing type deception need be established the challenge message 94 is issued without more whereas if it is determined that a test for detecting the existence of a spoofing type deception should be deployed the service provider 36 will establish the parameters of an appropriate test and include the established parameters in connection with or as part of the issued challenge. Additionally, the service provider 36 will also communicate the established parameters for the test to the service client 33 for use in and during the conduct of steps implicated in validating the purported access right of the end user 34 requesting access, which steps will be described in greater detail further herein.

With the challenge message 94 issued by the service provider 36 to the end user 34, the end user 34 then formulates a response to the challenge based upon information generally known only to the end user 34 and the service provider 36 and which, in no case, is ever known by or communicated to or through the service client 33. Once the end user 34 has formulated a response to the challenge, and assuming that the end user 34 desires to continue the in-process transaction, the end user 34 will then submit the formulated response to the service client 33 as an authentication credential.

Referring now then to FIGS. 3 and 4 in particular, validation 48 of the purported access right of the user requesting access to a secured resource is shown to generally begin with the submission to a service client 33 by the end user 34 of an authentication credential, which authentication credential has been previously formulated by the end user 34 in response to issuance by the service provider 36 of a challenge message 94. As shown in FIG. 3, however, service client systems 33 implemented as part of an authentication system 30 that comprises a means 35 for detecting the existence of a spoofing type deception will prior to allowing submission by the end user 34 of an authentication credential first determine whether under the circumstances of the particular request in process for access to a secured resource such a means 35 for detecting the existence of a spoofing type deception should be deployed. If in such an implementation it is determined that no test for detecting the existence of a spoofing type deception need be established the end user 34 is allowed by the service client 33 to submit the authentication credential without more whereas if it is determined that a test for detecting the existence of a spoofing type deception should be deployed the service client 33 will present to the end user 34 an appropriate test for detecting the existence of a spoofing type deception, wherein the presented test is constructed by the service client 33 using the test parameters as previously established and provided by the service provider 36.

In any case, an authentication credential submitted by the end user 34 must in order for the validation to continue be forwarded by the service client 33 to the service provider 36. In an optional but most preferred feature of the present invention, the service client 33 may be programmed or otherwise configured to ensure prior to forwarding an end user submitted authentication credential to the service provider 36 that a secure communication channel is first established between the service client 33 and the service provider 36. If in an implementation of this feature the required secure communication channel cannot be established between the service client 33 and the service provider 36 the continuing process 48 will generally terminate whereas if the required secure communication channel is successfully established between the service client 33 and the service provider 36 the process 48 will generally continue.

Upon successful forwarding by the service client 33 to the service provider 36 of the end user submitted authentication credential, the service provider 36 proceeds to validate the responsive authentication credential by comparing the authentication credential against a key string. As will be appreciated by those of ordinary skill in the art in light of this exemplary description, the key string will prior to or at the time of validation be determined by the service provider 36 utilizing knowledge of the previously discussed information generally known only to the end user 34 and the service provider 36 to formulate the key string as the known correct response to at least a portion of the previously issued challenge message 94 (the "primary challenge"). In addition to comparison of the authentication credential to a known key string, however, it is noted that in an authentication system 30 utilizing time 44 as an actor in order to provide a timeout for the validity of an outstanding challenge message 94, the service provider 36 will be programmed or otherwise adapted to determine as part of the validation step whether as a result of the passage of time the authentication credential should be deemed to be incorrect. In any case, if the authentication credential is found or otherwise deemed to be incorrect, the service provider 36 will preferably report the incorrect finding to the service client 33 and/or the end user 34 and the process 48 will generally terminate whereas if the authentication credential is found to be correct the process 48 will generally continue.

With the authentication credential found to be correct, the service provider 36 may simply report the correct finding to the service client 33 or, if for security or other reasons the service client 33 is unable to directly access features or functionality of a secured resource for which an end user actor 34 has requested access, the service provider 36 will then obtain for the end user 34 and/or the service client 33 the benefit of the requested secured resource and thereafter appropriately report the conducted transaction to the service client 33 and/or the end user 34.

With the foregoing broad overview of the general structure and function of the authentication system 30 of the present invention in mind, it is now noted that in accordance with the present invention an end user 34 may comprise any person or machine requiring, in connection with some other use, access or other relationship with a service client 33, access to a secured resource for which the service client 33 is restricted from full knowledge and for which the service provider 36 may hold full knowledge, full knowledge being defined herein as knowledge sufficient to make ordinary full use of the secured resource outside of the framework of the authentication system 30 and method 46 of the present invention. By way of simple example, the resource may comprise password protected information (e.g., a credit report) a portion of which (e.g., only the credit scores) a human end user 34 wishes to share with a service client 33 comprising an information consumer (e.g., a potential creditor) without providing to the information consumer the password (e.g., by which the full credit report is protected and as would otherwise enable the potential creditor to gain full access to the protected credit file). While the present invention contemplates that the service client 33 may be restricted from access to the content of a particular secured resource, in which case the service provider 36 may be adapted to obtain for the service client 33 the requested portion or benefit of the secured resource for which the end user 34 authorizes access, it should be noted that in at least some implementations of the present the secured resource may simply comprise a password or other authentication credential held by the end user 34. In this case, the authentication system 30 of the present invention may be implemented simply to provide a novel "universal password" system wherein the end user 34 is never required to provide his or her true password to any particular service client 34. In any case, under the present invention, a service provider 36 having associated therewith a hardware and/or software implementation of the previously generally discussed functionality is in accordance with the present invention programmed or otherwise adapted to receive directly from the service client 33 an end user submitted request for access to the secured resource and, thereafter, to validate that the end user submitted request as forwarded by the service client 33 is made under the authorization of an end user 34 having right of access to the secured resource. In a critical aspect of all implementations of the present invention, however, the actual information held by the end user 34 through which the service provider 36 is capable of authenticating the access right of the end user 34 is strictly withheld from the service client 33.

With this in mind, the end user 34 may, for example and without limitation, be a patient wishing to share medical information (a secured resource) with a caregiver (a service client 33) without having to grant to the caregiver unfettered access to all of his or her medical records; or may be the holder of a credit card account, banking account, automated teller machine ("ATM") card and/or account or the like (a secured resource) wishing to purchase merchandise, service, information or the like from a retail store, service station, on-line service provider or merchandiser, other business or the like (a service client 33) without providing the service client 33 with his or her full credit card information, e.g. without providing his or her Card Verification ("CV") code, banking account information, personal identification number ("PIN") associated with the ATM card or the like; or may be a credit applicant or other holder of an information product wishing to share a credit score or other information (a secured resource) with a consumer of information products, such as an automobile dealership in need of consumer credit data, (a service client 33) without providing his or her Social Security Number or other information not necessary to the conduct of the present transaction.

In at least one implementation of the authentication system 30 and method 46 of the present invention, however, the end user 34 may be the holder of an on-line service account protected by a password and wherein the on-line account is under the control of the service client 33 but the password (a secured resource) for access to or control of the account by the end user 34 is not known to the service client 33. In any case, in order to better describe the critical and other aspects of the present invention, however, reference is now made to the deployment diagram of FIG. 5 (comprising FIGS. 5A and 5B), wherein there is shown the various elements of an exemplary hardware and software based implementation of an authentication system 30 constructed in accordance with the teachings of the present invention.

Before continuing, however, it is noted that while the implementation depicted in FIG. 5 is exemplary of the authentication system 30 of the present invention, it is in no manner meant to be all encompassing or otherwise limiting of the wide range of implementations as are possible. In addition, it is noted that while some elements are in FIG. 5 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Figure 5A:
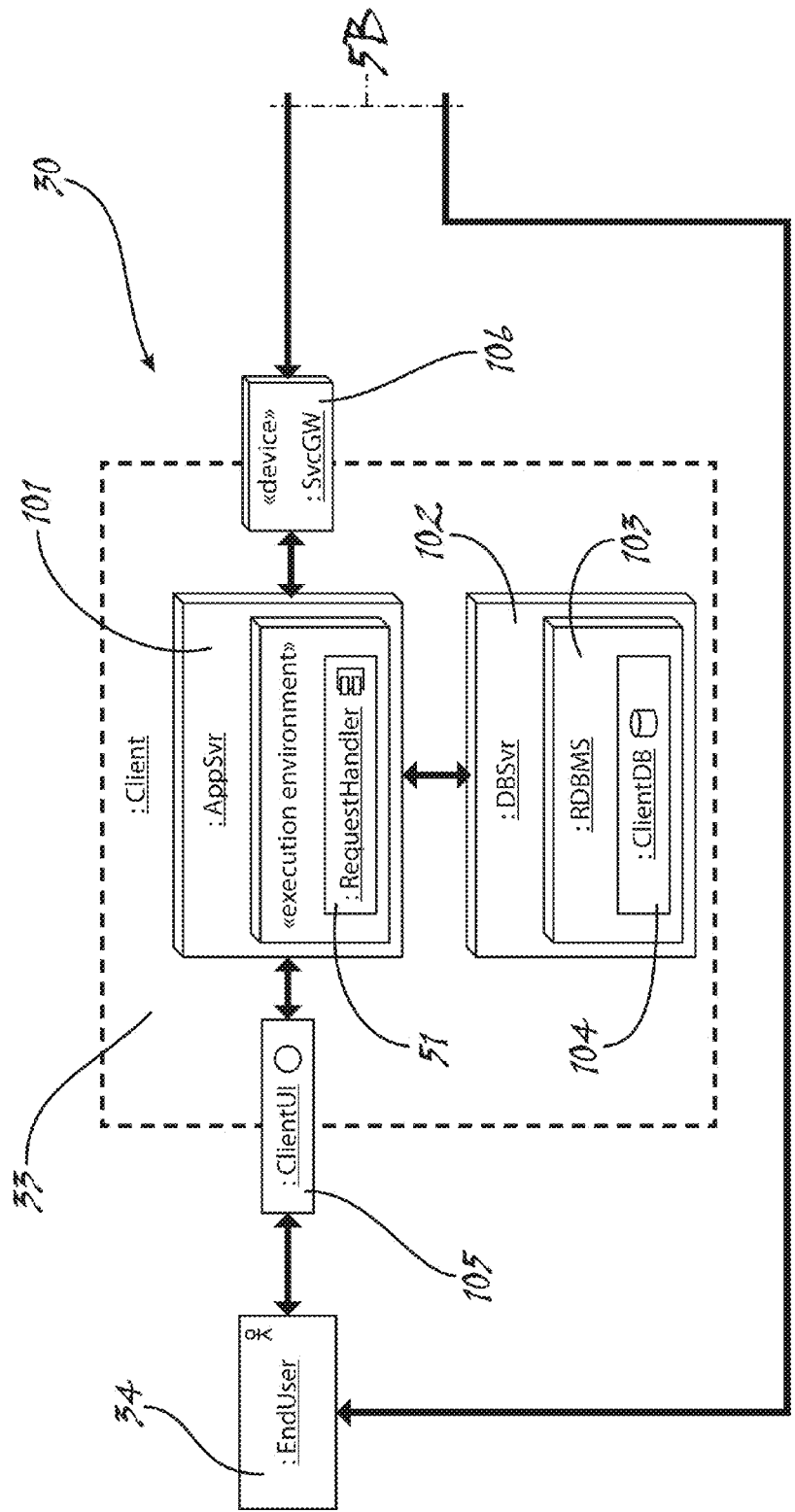
FIG. 5A, in particular, shows a service client and the various elements generally associated and/or typically collocated with a service client, and FIG. 5B, in particular, shows a service provider and the various elements generally associated and/or typically collocated with a service provider.

Turning then to FIG. 5, there is generally shown in FIG. 5A a service client 33 (such as, for example, may comprise a retail store, service station, on-line service provider or merchandiser or other business; a healthcare or medical insurance provider; an automated teller machine provider; a consumer of information products, such as an automobile dealership in need of consumer credit data; or the like) and various elements generally associated or often collocated with the service client 33. In particular, an exemplary service client 33 may deploy one or more application servers 101 or database servers 102 upon which may be hosted software functionality necessary to operation within the framework of the present invention in addition to the unrelated operations of the service client 33. In particular, an application server 101 may host a request handler software component 51 adapted to receive, process and/or otherwise handle requests and submissions from an end user 34 as well as to produce output for the end user 34 as may be necessary in the operation of the present invention. In facilitation of such activities, a database management system 103 comprising one or more client databases 104 may be provided to store and access data as may be required. Additionally, a client user interface 105 is provided and adapted to provide input from an end user 34 to the hardware and/or software systems of the service client 33 and to provide output from these systems to an end user 34. Finally, a service gateway 106 provides preferably secure communication between the service client systems 33 and the systems of the service provider 36.

Figure 5B:
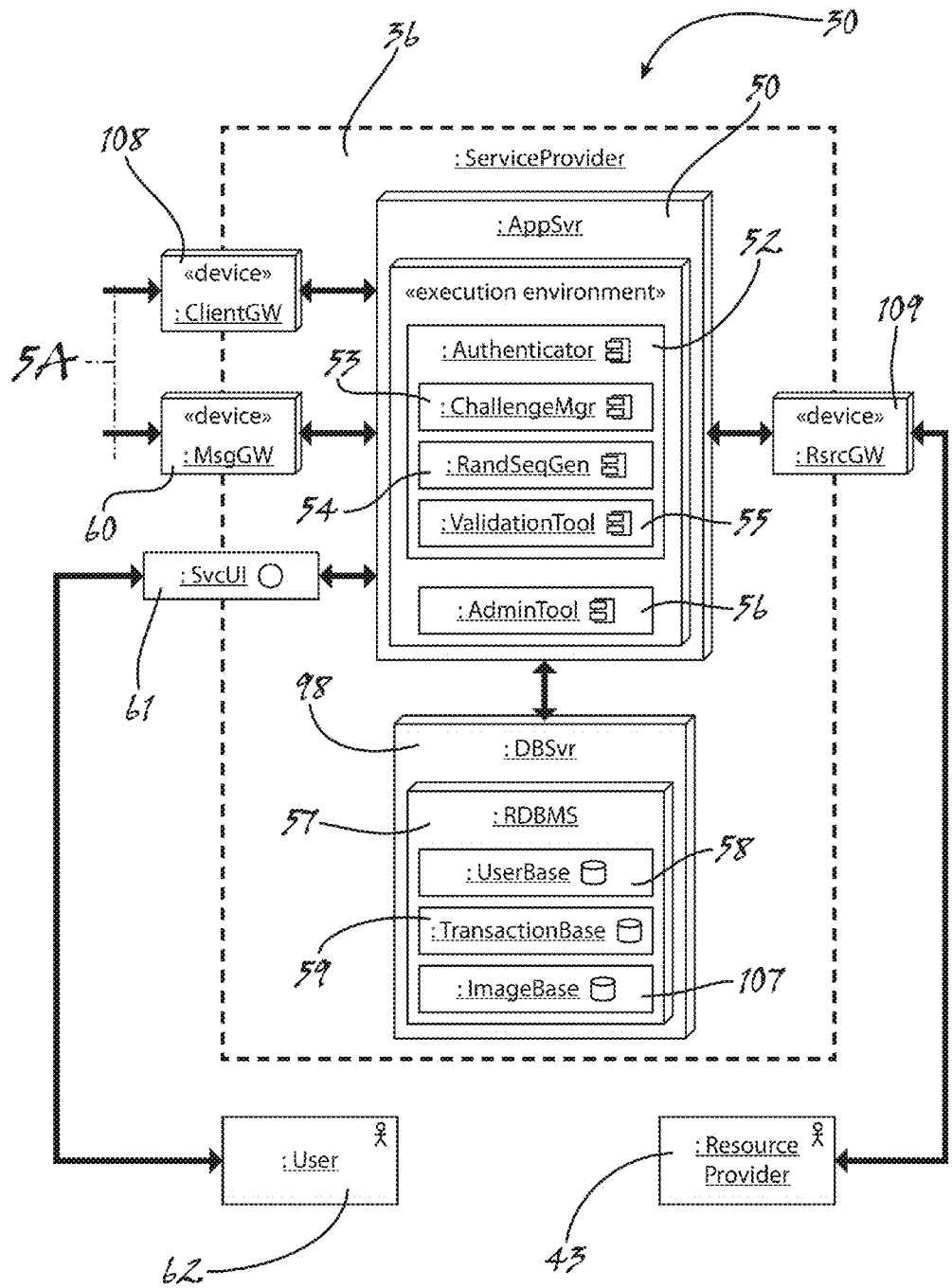

As is generally shown in FIG. 5B, a service provider 36 (such as, for example, may comprise a specialized provider of the authentication services of the present invention; a provider of other products or services having need of authentication services, such as, for example, a credit card processor or financial institution or an alarm monitoring company; or the like) also has associated therewith one or more application servers 50 or database servers 98 upon which may be hosted software functionality necessary to operation within the framework of the present invention. In particular, an application server 50 may host an authenticator 52 adapted to handle or otherwise control all aspects of the authentication process within the realm of responsibility of the service provider 36, including receiving authentication requests, storing and/or retrieving data pertinent to the processing of such requests, directing the generation and sending of challenge messages 94, and directing the validation of authentication credentials submitted in response to challenge messages 94 and actions taken based upon the results of such validations. In order to improve efficiency, the authenticator component 52 may comprise one or more further specialized components such as, for example, a challenge manager 53 adapted to facilitate creation and transmission of challenge messages 94, a random sequence generator 54 as may be useful in the highly specialized task of creating random sequences which, as will be better understood further herein, are an integral feature of the present invention, and a validation tool 55 adapted to conduct the specialized task of comparing received authentication credentials with known key strings. Additionally, the application server may also host an administration tool 56 through which various aspects of the setup, maintenance and operation of the hardware and software systems of the service provider 36 may be managed.

Figure 8:
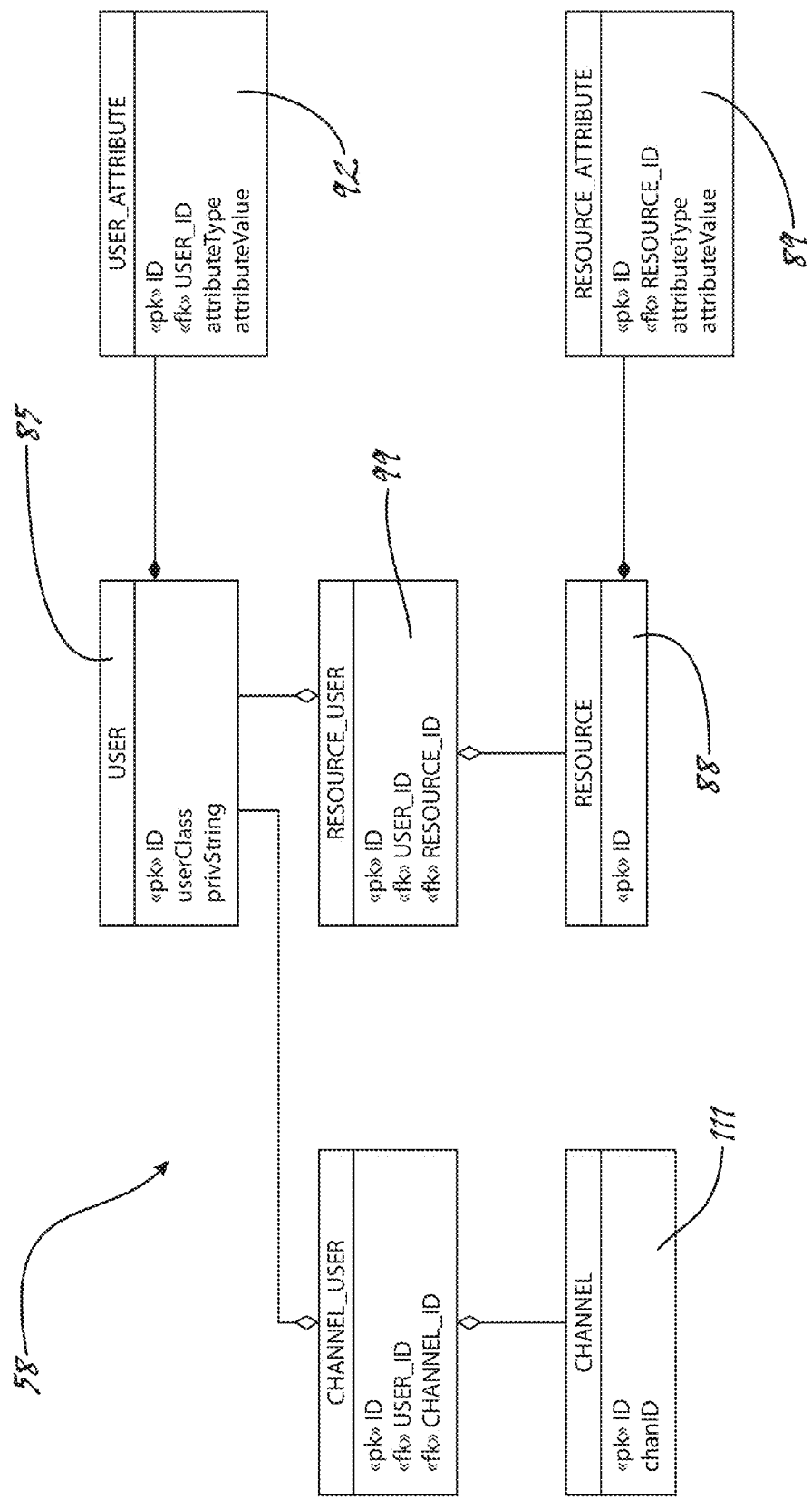
FIG. 8 shows, in a class diagram, a high level schema for a representative user database as may be implemented in connection with the exemplary hardware and software implementation of FIG. 5.
Figure 9:
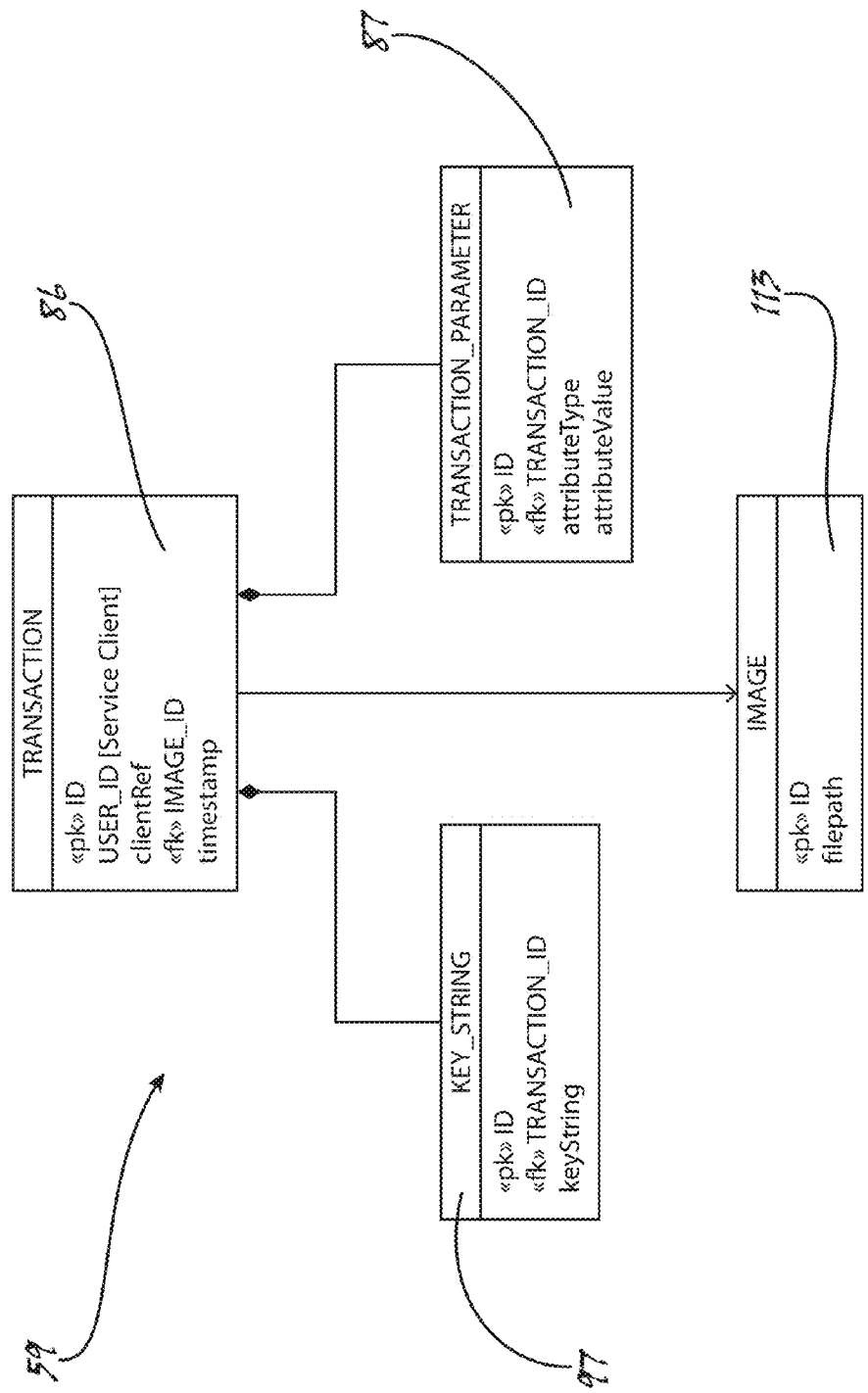
FIG. 9 shows, in a class diagram, a high level schema for a representative transaction database as may be implemented in connection with the exemplary hardware and software implementation of FIG. 5.

In order to efficiently manage and handle the large quantity of data that may typically be stored in connection with an implementation of the present invention, one or more dedicated database servers 98 hosting database management systems 57 are generally desired. As shown in FIG. 5B, a typical database management system may include a user database 58 for storing a wide variety of generally user centric data as may be required in the operation of the present invention, a transaction database 59 for storing data generally associated with the conduct of individual transactions and an image database 107, which, as will be better understood further herein, is particularly adapted for storing data associated with implementation of the means 35 for detecting the existence of a spoofing type deception. Although those of ordinary skill in the art will recognize that virtually unlimited alternatives are possible, FIG. 8 shows a very high level but generally representative schema for a user database 58 and FIG. 9 shows a very high level but also generally representative schema for a transaction database 59, each of which will be described in greater detail further herein in connection with an exemplary description of the conduct of a typical transaction.

Additionally, one or more client gateways 108 provide preferably secure communication between the service provider systems 36 and the systems of one or more service clients 33 and a preferably unified messaging gateway 60 is provided for use in issuing challenge messages 94 through various communication channels to end users 34. As will be appreciated by those of ordinary skill in the art, such a unified messaging gateway 60 may be utilized to transmit a generated challenge message 94 in any of a plurality of message formats (such as, for example, as a short messaging service ("SMS") message, a standard text message, an e-mail message, a synthesized voice message, an alphanumeric page or the like) over any of a plurality of communication channels (such as, for example, an SMS or other text channel, a simple mail transport protocol ("SMTP") channel, a plain old telephone system ("POTS") channel, a paging network or private broadcast channel or the like) to be received by any of a plurality of user devices (such as, for example, a mobile or landline telephone, a smart phone, an e-mail client, a personal data assistant ("PDA"), a numeric or digital pager or the like). Still further, a service user interface 61 is provided and adapted to provide input from all manner of users 62, including administrative users, end users 34 and service clients 33, to the hardware and/or software systems of the service provider 36 and to provide output from these systems to the various users 62. As will be appreciated by those of ordinary skill in the art, the provision of a service user interface 61, which of course should be secured, enables the various users 62 to maintain and/or otherwise manage the data stored in the user database 58 as may be appropriate as well as to generally manage and maintain the implemented authentication system 30. Finally, one or more resource communication gateways 109 may be provided in order to establish preferably secure communication between the systems of the service provider 36 and outside resource providers 43.

Figure 6:
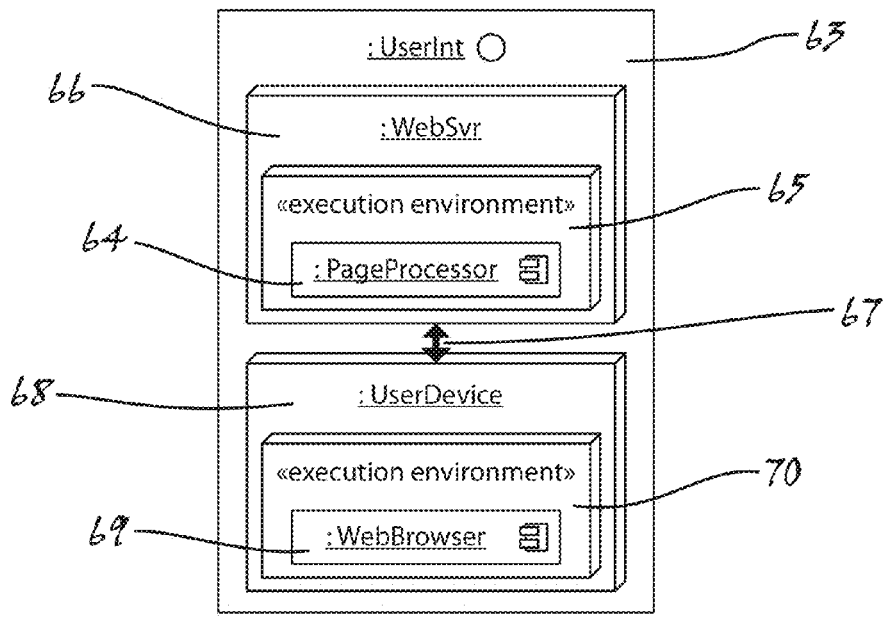
FIG. 6 shows, in a deployment diagram, various details of a representative web interface implementation of a user interface for use in connection with the exemplary hardware and software implementation of FIG. 5.
Figure 7:
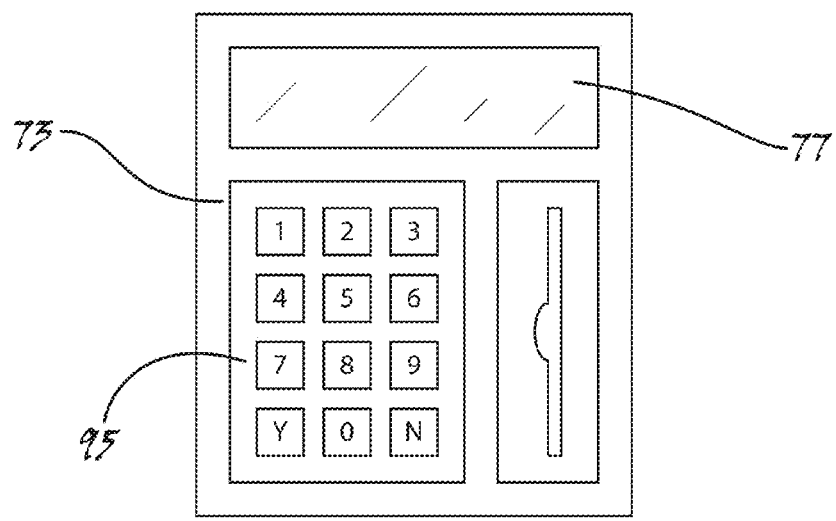
FIG. 7 shows, in an elevational representation, various details of a representative terminal device interface implementation of a user interface for use in connection with the exemplary hardware and software implementation of FIG. 5 such as may, in particular, be provided in connection with a service client implementing functionality of the present invention.

As exemplified by FIGS. 6 and 7, the client user interface 105 in particular, but also to some extent the service user interface 61, may take a wide variety of forms depending upon the circumstances of any particular implementation. For example, as shown in FIG. 6, a typical user interface may be implemented as a web interface 63 wherein there may be provided a page processor 64 hosted on an appropriate execution environment 65 installed on a dedicated web server 66 in Internet communication 67 with a user device 68, such as, for example, a personal computer, a smart phone, other mobile device 78 or the like, and on which is installed and/or hosted a web browser running 69 in a provided execution environment 70. On the other hand, as shown in FIG. 7, a client user interface 105 may comprise a more dedicated and integrated arrangement such as the depicted point-of-sale ("POS"), fueling station or automated teller machine ("ATM") terminal device 73 comprising as input modalities a keypad 95 and a card reader and comprising as an output modality a visual display such as the depicted screen 77. Additionally, those of ordinary skill in the art will recognize that in addition to the depicted implementations, the client user interface 105 may comprise a network interface such as may be utilized by a customer service representative (considered herein as an end user 34 acting through the representative), a telephone auto attendant, which may implement a DTMF decoder, speech recognition engine, TDD/TTY decoder or the like; or virtually any other combination of input modalities (including barcode readers or scanners, keyboards, keypads, card and/or magnetic stripe readers, pointing devices, microphones and the like) and output modalities (including visual displays such as computer or other device monitors or screens, audio output devices such as headphones or other speakers, tactile output devices such as may be adapted for the visually impaired and the like).

Continuing then with the example generally described with respect to FIG. 5, further details of the implementation are now described by way of the following detailed description of a possible use of the implementation for conducting a retail purchase transaction, which, for purposes of the example, shall be taken as completion of a purchase at an on-line retailer (the service client 33) by a consumer (the end user 34) having available for payment a credit card (secured resource) for which a CV or like code must be provided as a condition precedent to authorization of a credit card charge. To complete the transaction, the consumer will indicate a desire to make a credit card payment to the on-line retailer, which will forward the consumer's request (which will generally include the credit card number) to a service provider 36 for determination whether the identified credit card is a valid secured resource connected with the authentication system 30, for authentication of the consumer's right of access to the identified credit card and for obtaining payment for the on-line retailer from the identified credit card. In accordance with a critical aspect of the present invention, however, the on-line retailer must not be given any information that would allow the on-line retailer to repeat the transaction without again obtaining authorization from the consumer (i.e., the on-line retailer must not be provided with access to the CV or like code required under the present example for authorization of a transaction charged against the consumer's credit card).

Figure 10:
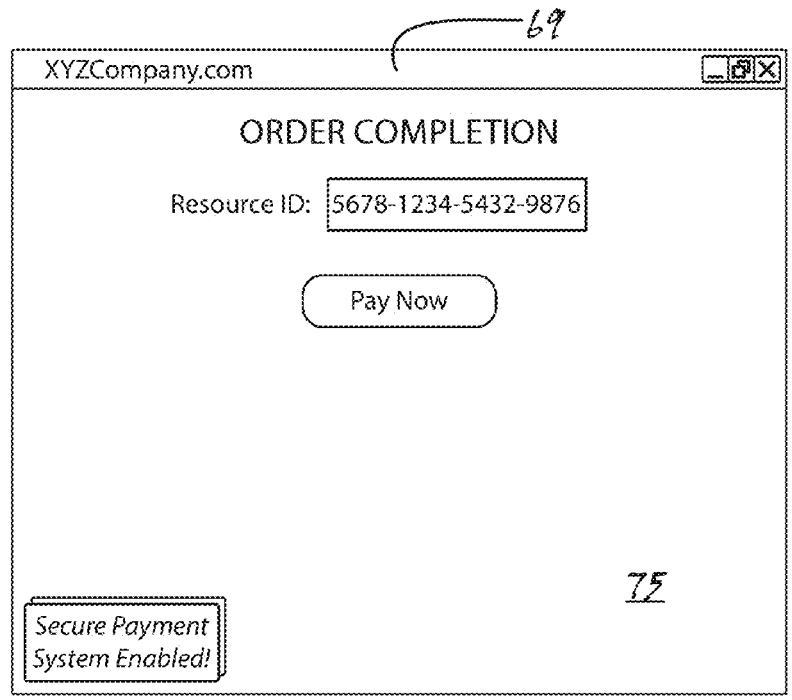
FIG. 10 shows, in a screen representation of a web browsing application, a first exemplary implementation of an order completion page from a website showing, in particular, various details of the manner for making in accordance with the present invention a request for access to a secured resource.

To begin the process, then, the consumer end user 34 will use his or her web browser 69 to first navigate to the uniform resource locator ("URL") of an order completion webpage 75 for the on-line retailer service client 33. As is otherwise conventional, the consumer's web browser 69 will send a page request to the on-line retailer's web server 66 where a hosted page processor 64 will create and send back to the consumer's web browser 69 the requested "order completion" webpage 75, making use if required of the on-line retailer's client database 104 to retrieve stored information pertaining to the consumer, the transaction or the like. As shown in FIG. 10, the requested page 75 may simply comprise a simple form through which the consumer may input information indicative of the nature of the consumer's request for access to a secured resource. In this case, the consumer enters the credit card number for the credit card for which he or she requests use (access) and then selects the depicted "pay now" button. With the data entered as shown, the consumer's web browser 69 submits the data to the on-line retailer's web server 66 where the hosted page processor 64 may validate the form data for technical completeness and accurate formatting. Assuming that the submitted data is technically correct or is subsequently made technically correct, the page processor 64 submits the consumer's request to the request handler 51 hosted on the on-line retailer's application server 101.

At this point, in an optional feature of the present invention, the on-line retailer may choose to verify that the tentatively identified consumer presenting the credit card is permitted to make use of the on-line retailer's services for the requested purposes. For example, it may be that the on-line retailer requires registration prior to use of the authentication system 30 and method 46 of the present invention which, it is noted, may be utilized in a completely anonymous fashion to conduct extraordinarily secure financial and other transactions. If so, the request handler 51 may access the client database 104 or other accessible data store to determine that the tentatively identified consumer is a valid end user 34 from the perspective of the on-line retailer.

In any case, the request handler 51 will generally continue by creating a client reference for the transaction and assembling any other necessary parameters, such as payment amount, for transmission to the service provider 36. As will be appreciated by those of ordinary skill in the art, under many circumstances a service client 33 will have available all or virtually all information necessary for submitting (on behalf of an end user 34) a request to the service provider 36 without need for the end user 34 to enter additional data. For example, in a case where the consumer is otherwise "logged in" to the on-line retailer's website and the on-line retailer has previously stored the consumer's credit card number the consumer need only indicate that he or she wishes to "pay now" in order to make complete use of the facilities of the present invention. In any case, once assembled the complete request data, including unique client reference but not necessarily including the credit card number, is preferably stored in the client database 104 for retrieval as may be required. In the case of a real-time transaction, however, storage is not required.

When the end user submitted request (including at least the credit card number) is thus ready for forwarding by the on-line retailer to a service provider 36 appropriate for handling the type of request made, the request handler 51 will generally queue the request at the on-line retailer's service gateway device 106. If not already established, the service gateway device 106 will then undertake to establish secure communication with the corresponding client gateway device 108 at the service provider 36. As will be appreciated by those of ordinary skill in the art, because the relationship between a service client 33 and a service provider 36 will generally be ongoing, well known and fairly static, the required secure communication may be established through any number of very secure protocols including, for example, the use of cryptography, Internet Protocol ("IP") verification and the like. In any case, once the required secure communication is established the service gateway 106 will forward the consumer's completed request through the established secure communication channel to the service provider's client gateway 108, where the nature of the request will be identified and the request will then be conventionally routed to the authenticator 52 hosted on the service provider's application server 50.

Upon receipt of the consumer's request, the authenticator 52 will generally first undertake to determine whether the credit card for which the end user 34 has requested access is recognized at the service provider 36. To this end, the authenticator 52 may access the user database 58, as generally shown in FIG. 8, to determine whether the provided credit card number can be located in the resource table 88 of the user database 58. If not, the authentication process 46 may be terminated without or, preferably, with notice to the service client 33 or an appropriate message may be transmitted from the service provider 36 to the service client 33 allowing the service client 33 to prompt the end user 34 for correction and reentry of the unrecognized identifying information. If, on the other hand, the provided credit card number is recognized the authenticator 52 will proceed to establish a new transaction record in the transaction table 86 of the transaction database 59, as generally shown in FIG. 9, and at this time should also store in the transaction record the unique USER_ID by which the on-line service provider is known in the user database 58 and the on-line retailer's client reference. Additionally, transaction parameter records may be created in the transaction parameter table 87 of the transaction database 59 in order to collect and store information pertinent to the continued processing of the transaction such as, for example, the unique RESOURCE_ID by which the identified credit card is known in the user database 58, the amount of the requested payment or the like. Still further, the unique USER_ID by which the tentatively identified consumer is known in the user database 58, as may be determined (if not provided as part of the forwarded request) with reference through the resource use table 99 to the user table 85 of the user database 58, should also be stored in the transaction parameter table 87 of the transaction database 59.

With the end user 34 and the resource for which the end user 34 requests access both identified and logged to the transaction database 59, the authenticator 52 next undertakes to direct the generation of an appropriate challenge message 94, the response to which may be used to positively authenticate the identity of the presently tentatively identified end user 34. In order to best understand the challenge and response protocols of the present invention, however, it is instructive to expressly define a number of terms. To that end, a "string" shall for purposes of the present invention be expressly defined to mean "an ordered sequence of any subset of symbols selected from a set of symbols wherein each symbol forming the set may be represented in both a format that may be perceived by an end user 34 and a format that may be recognized by software or hardware," e.g. the set of all alphabetic and numeric characters in the English language, each of which, of course, may be presented in written or audible form for perception by an end user 34 and also may be encoded as binary data for recognition by software or hardware. A "null character" shall for purposes of the present invention be expressly defined as "a specially designated symbol intended to indicate the absence from a sequence of a single symbol," e.g. a box with an X character, as shown in the drawings forming a part of this specification, any symbol (such as a particular number, particular letter, an asterisk, an underscore or the like) designated at implementation to be defined as being a null character or a blank space. "Random" as applied to the characterization of a string shall for purposes of the present invention be expressly defined to mean that the symbols of the string are arranged in an order that is not readily predictable.

In accordance then with the authentication system 30 and method 46 of the present invention, the primary challenge is generated to include a random string comprising a plurality of symbols wherein at least one of the symbols of the string is a null character, such a random string being referred to herein as a challenge string 49. Additionally, each end user 34 (and, if desired, also other types of users such as client users and/or administrative users) will have stored in the user table 85 of the user database 58 a private string, which is a user selected or assigned (depending on implementation preferences) string comprising symbols of the same set as used for generating the challenge string 49 but most preferably excluding use of the null character. The private string is generally only known to the user with which it is associated and the service provider 36. As will be better understood further herein, a user will formulate a response to a challenge string 49 by using the symbols of the user's private string to replace the null character or characters of the challenge string 49 to formulate a response string. In this manner, the response string may be passed through the service client 33 without the service client 33 being able to detect the private string and, accordingly, a system of readily established single use "passwords" is presented. Additionally, as also will be better understood further herein, the authentication system 30 and method 46 of the present invention may be implemented such that the protocol for creating a response string from a challenge string 49 is standardized in advance or, in the alternative, instructions 93 may be provided with the challenge message 94 or inferred from the manner of delivery of the challenge or circumstances of the use. For example, the user may be directed to formulate the response string using only numbers of the private string or may assume that only numbers should be used when entering the response string into a limited keypad 95 such as depicted in FIG. 7. Further, instructions 93 may be given to use every second or third symbol of the private string, to begin with a certain symbol of the private string, to take symbols from the private string in reverse order, or any combination of these and similar instructions 93. Still further, the user may be instructed as standard procedure or by challenge message 94 to repeat usage of certain symbols of the private string or the entire private string in order to respond to a challenge string 49 with more null characters than symbols available in the user's private string and/or simply as a matter of choice by the service provider 36.

Returning then to the example use of the authentication system 30 of the present invention it is noted that in the most preferred embodiment of the present invention prior to directing the generation of a challenge message 94 the authenticator 52 evaluates all available information that may impact the ability of an end user 34 to readily receive a particular challenge message 94 and/or to readily respond to a particular challenge message 94 and, additionally, determines whether any special security requirements may exist for access to the particular resource. In particular, the authenticator 52 will preferably obtain from the channel table 111 of the user database 58 channel data indicating the type of communication channel that will be utilized to transmit the challenge message 94. Additionally, the user attribute table 92 of the user database 58 may indicate whether the end user 34 suffers any disability that would impact the manner of response and/or may contain data associated with a service client 33 that may indicate special security requirements, such as a minimum length for the response string, or capabilities or limitations of the client user interface 105, such as being limited to entry of numeric characters only. Still further, the resource attribute table 89 of the user database 58 may also indicate special resource dictated security requirements, such as minimum length or desired complexity for a response string. In any case, the authenticator 52 will determine the characteristics that should be exhibited by the challenge string 49, including the manner of issuance, and will then instruct the challenge manager 53 to initiate issuance of a challenge message 94.

At this point it is noted that in accordance with an extension of the present invention, the primary challenge (comprising the challenge string 49 and any necessary response instructions 93) may be supplemented with the provision of a test designed to detect the existence of a spoofing type deception. In particular, the present invention contemplates the use of a dynamically selected image 112 for the conduct of this test. Although the particular conduct of this test will be described in greater detail further herein, it should at this time be noted that in an implementation wherein such a test will be required the challenge manager 53 will generally at this point in the process obtain from the image database 107 image data identifying the selected image 112 and its location on a fileserver and will store the obtained image data in the image table 113 of the transaction database 59. In any case, the challenge manager 53 will continue to obtain from the random sequence generator 54 a challenge string 49 meeting the requirements established and communicated by the authenticator 52. With the challenge string 49 generated and any image data obtained, the challenge manager 53 will proceed to construct the challenge message 94 which will at least comprise the challenge string 49, any special response instructions 93 and a copy of the image file if required. With the challenge message 94 assembled, the challenge manager 53 queues the challenge message 94 by providing the messaging gateway 60 with the challenge message 94, the type of communication channel to be utilized and the CHANNEL_ID for the channel. For example, if the challenge message 94 is to be sent by SMS text message 79, the challenge manager 53 will inform the messaging gateway 60 that the challenge message 94 is to be transmitted by SMS text message 79 and will provide the messaging gateway 60 with a telephone number for a SMS text capable user device.

At this juncture it is noted that it is considered critical to the present invention that the challenge message 94 be transmitted through a discrete channel, which is herein defined as being a communication channel not readily identifiable by information submitted by an end user 34 in making a request for access to a secured resource. For example, if the end user 34 chooses to utilize his or her electronic mail address as a user identification, the schema for the user database 58 and/or the authenticator 52 should ensure that the challenge message 94 is not transmitted by electronic mail to the same electronic mail address. Likewise, an end user 34 requesting access to a secured resource using his or her mobile telephone number as an identifier will not be able to receive a challenge message 94 by SMS or standard text message 79 or synthesized voice call to the same mobile telephone number. That said, however, it is noted that the schema as depicted in FIG. 8 contemplates that a single user may have more than one possible message channels assigned. As a result, a channel may be discrete for some requests, but not for others depending upon the information provided by the end user 34 to the service client 33 in making a particular request.

Figure 11:
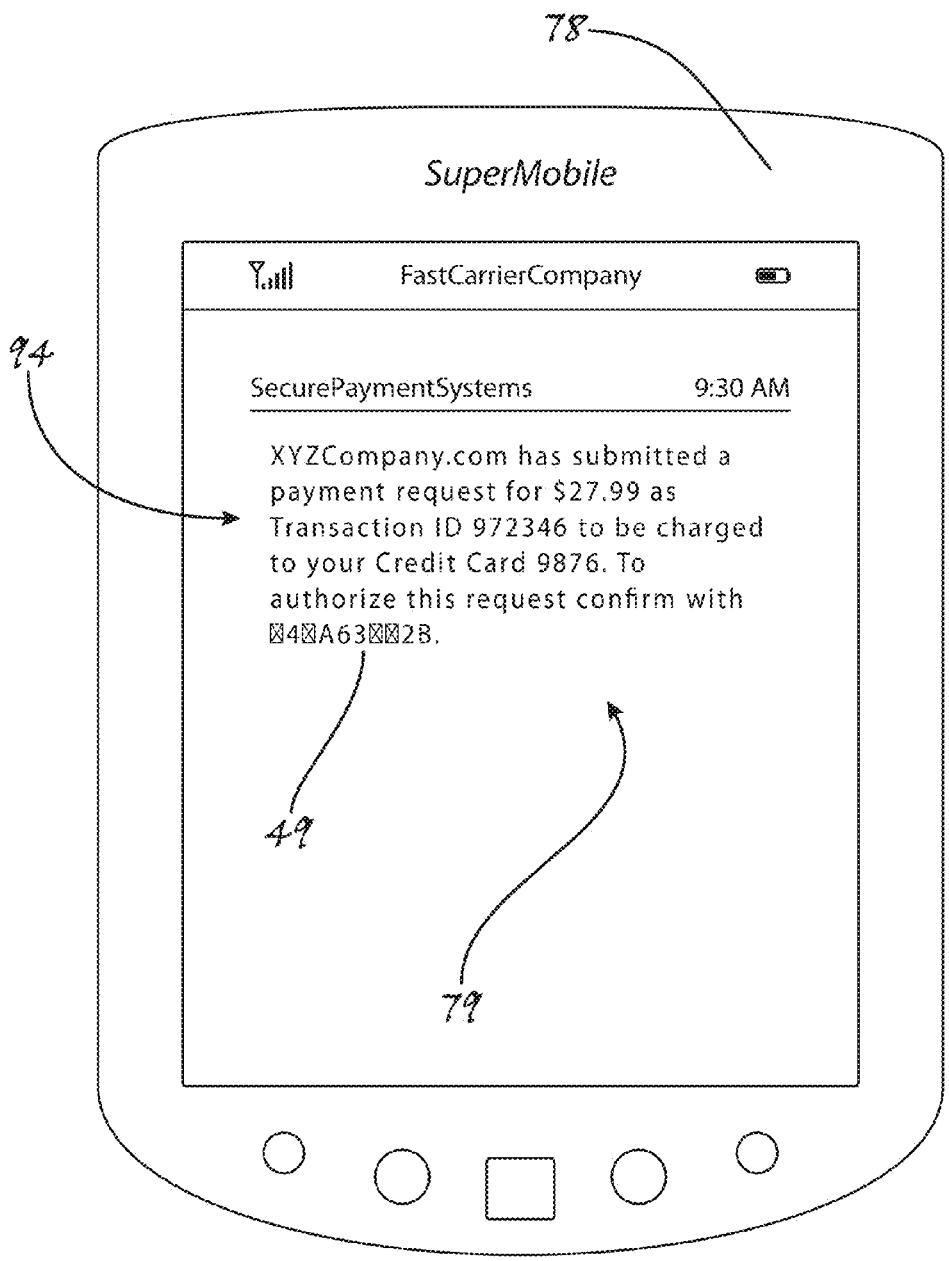
FIG. 11 shows, in a top plan representation of a mobile telecommunications device screen, a first example of a challenge message such as may be implemented in accordance with the present invention.

Referring to FIG. 11 in particular, there is shown a typical simple challenge message 94 as may be transmitted to an end user 34 through an SMS text enable smart phone or like mobile device 78. Following with the presented example, it is noted that in an optional but useful feature of the present invention the challenge message 94 may also include information helpful to the consumer in making a response. For example, the challenge message 94 depicted in FIG. 13 includes the name of the on-line service provider, the purchase amount for which the user requests access to his or her secured resource and also the client reference used by the on-line service provider.

Substantially contemporaneously with transmission of the challenge message 94, the challenge manager 53 will report transmission of the challenge message 94 to the authenticator 52. With the challenge message 94 transmitted, the authenticator 52 will then proceed to provide the service client 33 with the image data necessary to the conduct of any required test designed to detect the existence of a spoofing type deception. As previously noted, the challenge manager 53 sent an image file to the consumer. Rather than providing such an image file to the service client 33, however, the preferred implementation of the test comprises sending to the service client 33 a file location for a copy of the image file resident on a fileserver associated with the service provider 36, which file location may then be made temporary for use as will be better understood further herein. In any case, once an appropriate message containing the necessary image data is generated, the authenticator 52 will generally queue the spoofing test message at the service provider's client gateway device. If not already established, the client gateway device 108 will then undertake to establish secure communication with the corresponding service gateway device 106 at the service client 33. Once the required secure communication is established the client gateway 108 will forward the spoofing test message through the established secure communication channel to the service client's service gateway 106, where the nature of the spoofing test message will be identified and the spoofing test message will then be conventionally routed to the request handler 51 on the service client's application server 101. Once received by the request handler 51, the request handler 51 will proceed to store the image data in along with the previously stored request data in the client database 104 for later use as will be explained in greater detail further herein.

Finally, the authenticator 52 obtains the consumer's private string from the user table 85 of the user database 58, as shown in FIG. 8, and then submits the challenge string 49 (along with any special instructions 93) and the private string to the validation tool 55, which in turn determines the correct response string. The determined correct response string is then assigned as the key string for the transaction and stored in the key string table 97 of the transaction database 59. At this time, a timestamp may also be entered into the transaction table 86 of the transaction database 59 in order to provide a reference by which may be calculated a timeout event for the validity of the key string (response string submitted as an authentication credential).

Figure 12:
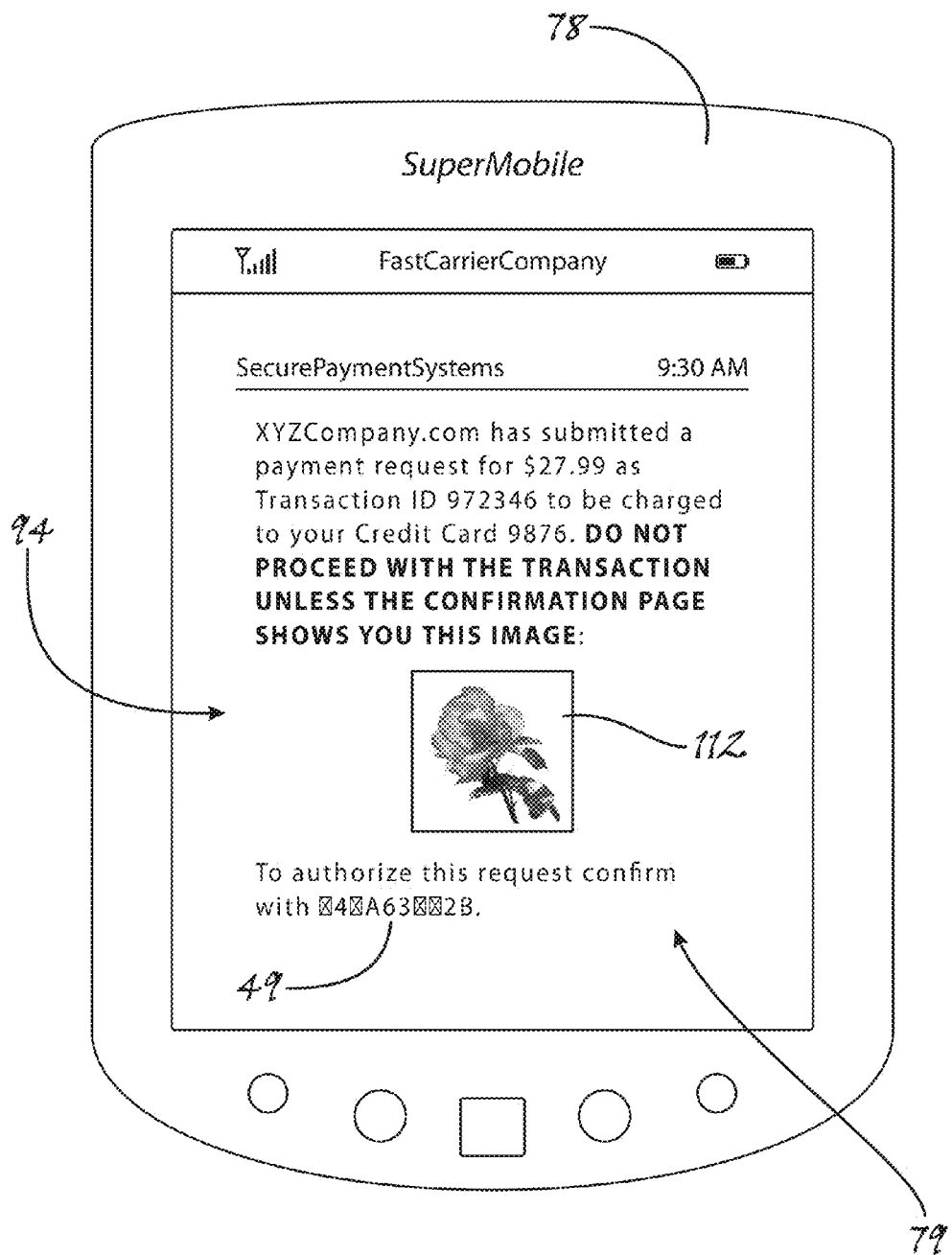
FIG. 12 shows, in a top plan representation of a mobile telecommunications device screen, a second example of a challenge message such as may be implemented in accordance with the present invention showing, in particular, extended functionality for use in detecting a spoofing type deception.
Figure 13:
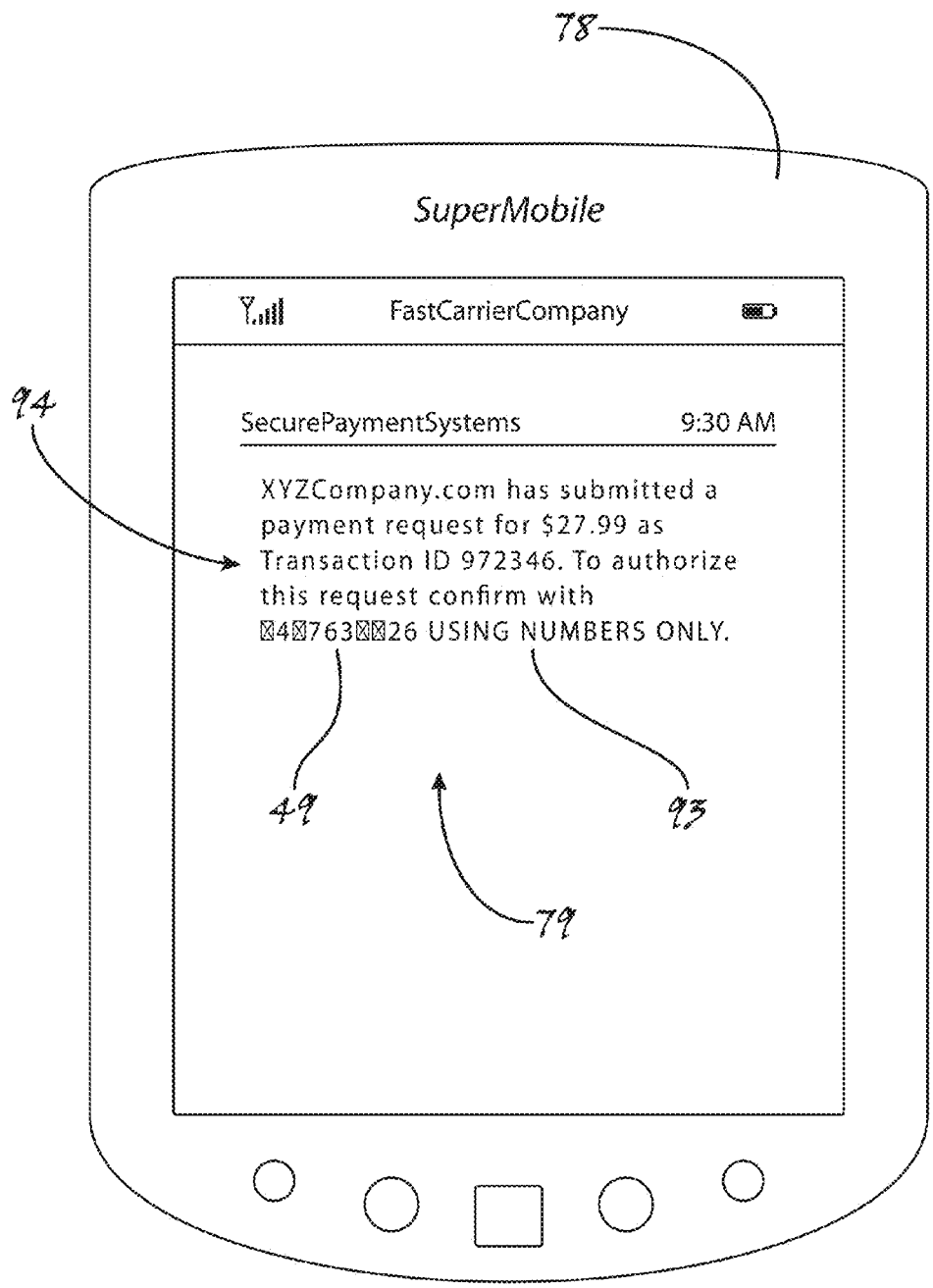
FIG. 13 shows, in a top plan representation of a mobile telecommunications device screen, a third example of a challenge message such as may be implemented in accordance with the present invention showing, in particular, extended functionality for accommodating constraints imposed by the available means for submitting of an authentication credential for purposes of validating the purported access right of a user requesting access to a secured resource in accordance with the present invention.

Before turning the example to detailed discussion of the steps 48 implicated in validating the purported access right of the user requesting access to the secured resource, however, attention is directed to FIGS. 12 and 13, which each depict some variation of possible challenge messages 94 and/or additional detail regarding the presentation to the consumer of an image 112 for use in detecting a possible spoofing type deception. In FIG. 12, in particular, an image 112 is shown as being presented with the challenge string 49 as part of the challenge message 94. As indicated by the example instruction text included with or as part of the challenge message 94, the consumer is directed to look for a corresponding image to be displayed on the website of the on-line retail store and to not enter a response string unless the correct image is observed. FIG. 13 shows one simple example of the many previously discussed possibilities for providing special instructions 93 in connection with the issuance of a challenge message 94. In the depicted case, the consumer is directed to respond to the challenge string 49 using only numbers from his or her private string. As will be appreciated by those of ordinary skill in the art, this instruction 93 will be particularly beneficial when it is known that the consumer will be forced to enter the response string through a limited input modality such as, for example, the simple keypad 95 depicted in FIG. 7.

Figure 14:
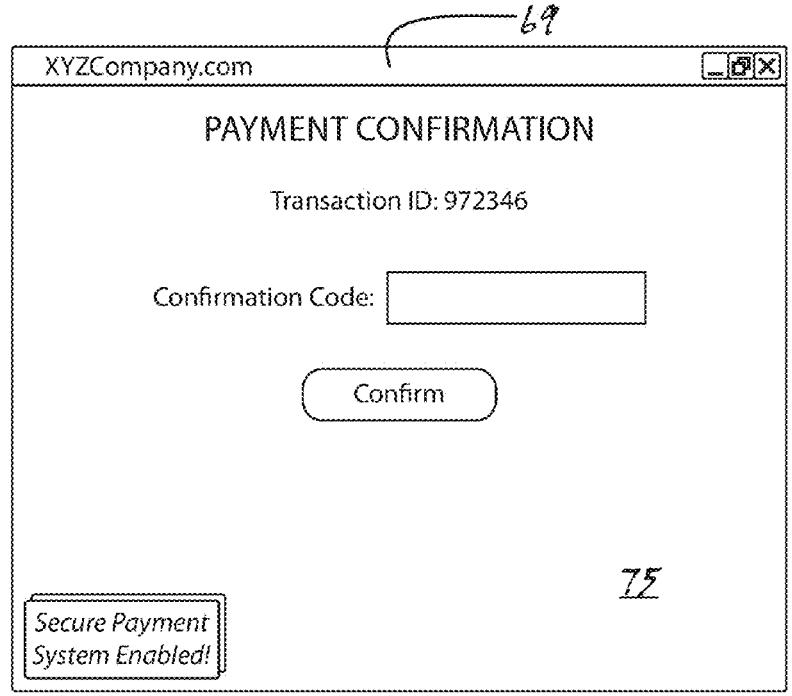
FIG. 14 shows, in a screen representation of a web browsing application, a first exemplary implementation of a payment confirmation page from a website showing, in particular, various details of the manner for submitting of an authentication credential for purposes of validating the purported access right of a user requesting access to a secured resource in accordance with the present invention.
Figure 15:
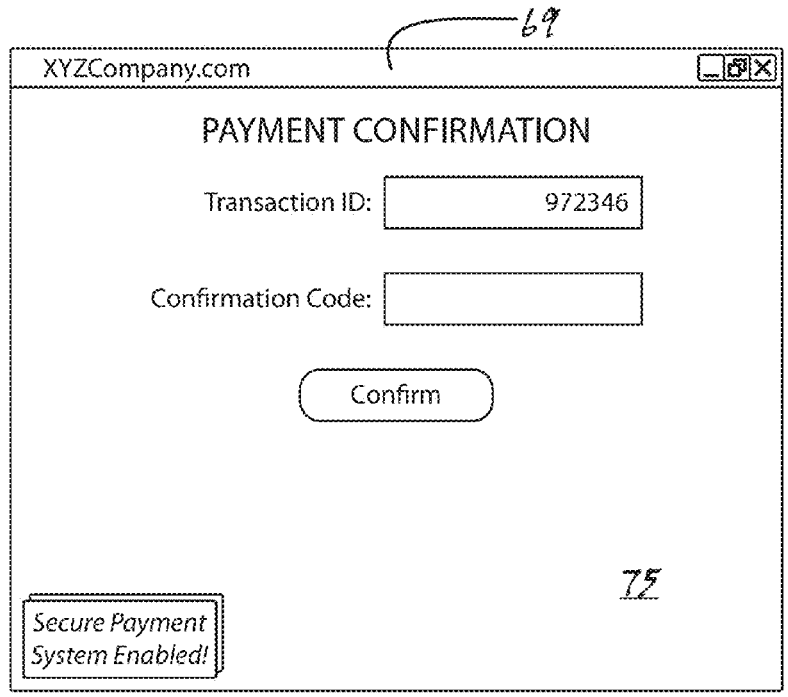
FIG. 15 shows, in a screen representation of a web browsing application, a second exemplary implementation of a payment confirmation page from a website showing, in particular, various details of the manner for submitting of an authentication credential for purposes of validating the purported access right of a user requesting access to a secured resource in accordance with the present invention.

Turning the example now to detailed discussion of the steps implicated in validating the purported access right of the user requesting access to the secured resource, it is first noted that an end user 34 of the present invention will necessarily formulate a response string corresponding to a challenge string 49 outside of the hardware and/or software provided as part of the authentication system 30 of the present invention. That said, the validation steps begin with the consumer using his or her web browser 69 to first navigate to the uniform resource locator ("URL") of a payment confirmation webpage 75 for the on-line retailer service client 33. As is otherwise conventional, the consumer's web browser 69 will send a page request to the on-line retailer's web server 66 where a hosted page processor 64 will create and send back to the consumer's web browser 69 the requested "payment confirmation" webpage 75, making use of the on-line retailer's client database 104 to retrieve stored information pertaining to the consumer, the transaction or the like. As shown in FIG. 14, the requested page 75 may simply comprise a simple form through which the consumer may input his or her formulated response string and then select the depicted "confirm" button. As will be appreciated by those of ordinary skill in the art, this simple example assumes that the consumer has remained on the website of the on-line retailer such that the transaction identifier remains known to the page processor 64 and also that no test designed to detect the existence of a spoofing type deception will be presented. Similarly, the requested page 75 as depicted in FIG. 15 also assumes that no test designed to detect the existence of a spoofing type deception will be presented, but contemplates that the consumer may have left and returned to the website for completion of the purchase transaction. As will be appreciated by those of ordinary skill in the art in light of this exemplary description, the depictions of FIGS. 14 and 15 may be appropriate for responding to the challenge as depicted in FIG. 11. For purposes of this continuing example, it shall be assumed that the consumer's private string is 2F46DAH525. As a result, the correct response string for the challenge string 49 of FIG. 11 would be 24FA63462B, which would be entered by the consumer. With the response string entered, the consumer's web browser 69 submits the data to the on-line retailer's web server 66 where the hosted page processor 64 may validate the form data for technical completeness and accurate formatting. Assuming that the submitted data is technically correct or is subsequently made technically correct, the page processor 64 submits the consumer's response string to the request handler 51 hosted on the on-line retailer's application server 101.

Figure 16:
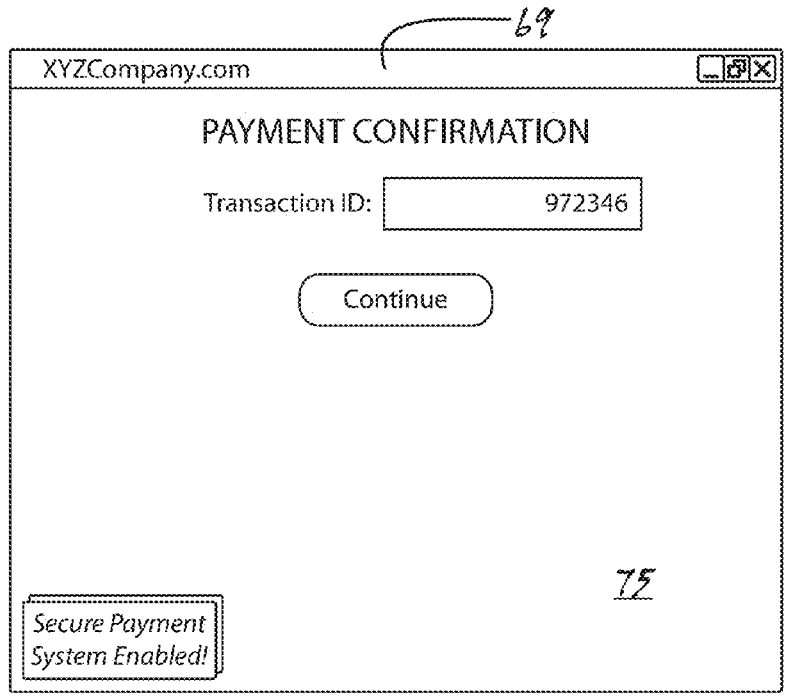
FIG. 16 shows, in a screen representation of a web browsing application, an exemplary implementation of a preliminary payment confirmation page from a website showing, in particular, various details of at least one method for accessing a further payment confirmation page.

As shown in FIG. 16, however, the requested page 75 may comprise a slightly more complex form through which the consumer may be required to enter the client reference for the transaction although, as shown in FIG. 16 the client reference data may be pre-populated if the consumer has not left the website. As will be appreciated by those of ordinary skill in the art, this form contemplates that the consumer may want to address a different transaction than presently being handled by the webpage 75 or that the consumer has left and returned to the website for completion of the purchase transaction. Additionally, this exemplary form contemplates that a test designed to detect the existence of a spoofing type deception may or may not be presented. In any case, once the consumer is satisfied that the desired client reference is shown the consumer will then select the depicted "continue" button, whereafter the consumer's web browser 69 submits the data to the on-line retailer's web server 66 where the hosted page processor 64 may validate the form data for technical completeness and accurate formatting. Assuming that the submitted data is technically correct or is subsequently made technically correct, the page processor 64 submits the consumer's response string to the request handler 51 hosted on the on-line retailer's application server 101. Once received by the request handler 51, the client reference will be utilized to retrieve the stored request data from the client database 104 and the request handler 51 will determine whether a test designed to detect the existence of a spoofing type deception should be presented. If not, the request handler 51 will so inform the page processor 64 which, in turn, may then update or otherwise create and send back to the consumer's web browser 69 a "payment confirmation" webpage 75 like that of FIG. 14, whereafter the consumer continues as previously discussed.

Figure 17:
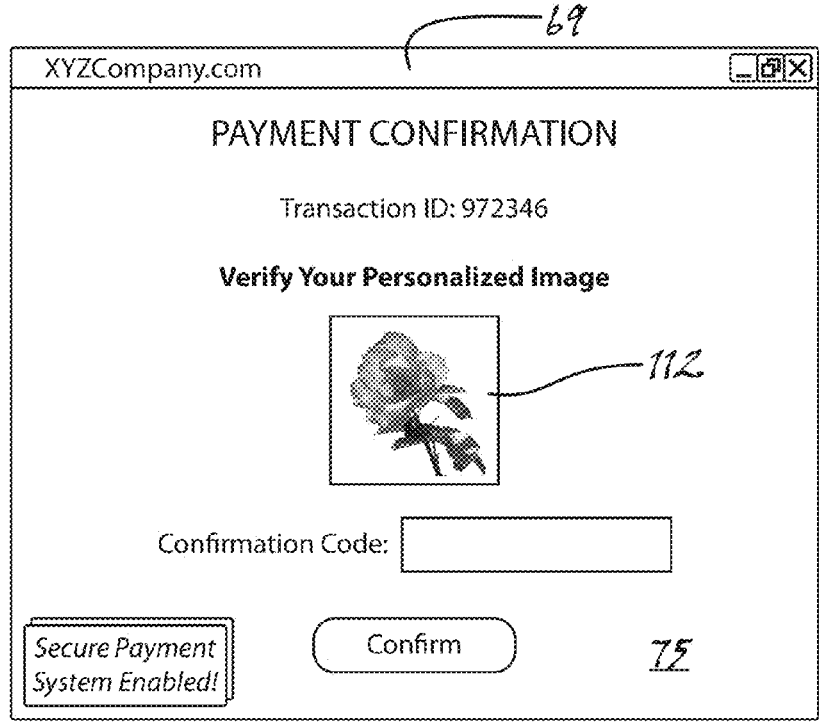
FIG. 17 shows, in a screen representation of a web browsing application, a third exemplary implementation of a payment confirmation page from a website showing, in particular, various details of a first implementation of extended functionality for use in detecting a spoofing type deception.

If, on the other hand, the request handler 51 determines that a test designed to detect the existence of a spoofing type deception should be presented the request handler 51 will retrieve from the client database 104 the image data previously transmitted from the service provider 36 and associated with the transaction by client reference. In the preferred embodiment of the present invention, the image data will comprise a web address pointing to a publicly accessible image file matching the image file transmitted as part of the challenge message 94 to the consumer. The page processor 64 will then create a page 75 such as depicted in FIG. 17, wherein the webpage 75 presents the image 112 by linking to the external web address at which the image 112 is hosted. As will be appreciated by those of ordinary skill in the art in light of this exemplary description, the depiction of FIG. 17 may be appropriate for responding to the challenge as depicted in FIG. 12. Assuming still that the consumer's private string is 2F46DAH525, the correct response string for the challenge string 49 of FIG. 12 would again be 24FA63462B, which would be entered by the consumer.

Figure 18:
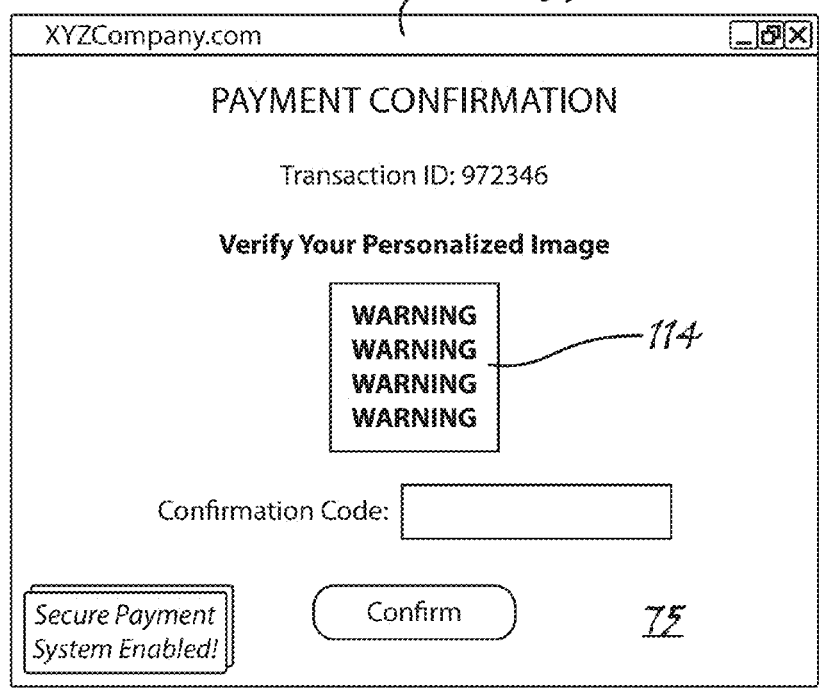
FIG. 18 shows, in a screen representation of a web browsing application, the implementation of the payment confirmation page of FIG. 17 showing, in particular, various additional details of the implemented extended functionality for use in detecting a spoofing type deception.

As previously discussed, the preferred implementation of the test designed to detect the existence of a spoofing type deception comprises sending the service client 33 a file location for a copy of the image file resident on a fileserver associated with the service provider 36, which file location may then be made temporary. By making the file location temporary, the file can be removed or restricted and/or replaced with a warning image once accessed. In this manner, if the consumer has accidently navigated to a spoofed website conducting a man-in-the-middle type deception in particular, the bad actor will in the course of accessing the true on-line retailer's website access the image link. In the unlikely case that the bad actor is able to retrieve and replicate the link for presentation to the consumer, however, the image 112 will have been removed or replaced by the time that the consumer links to the web address for the image. In this case, as shown in FIG. 18, the consumer will see the bad actor generated webpage with the prominently displayed warning image 114.

Figure 19:
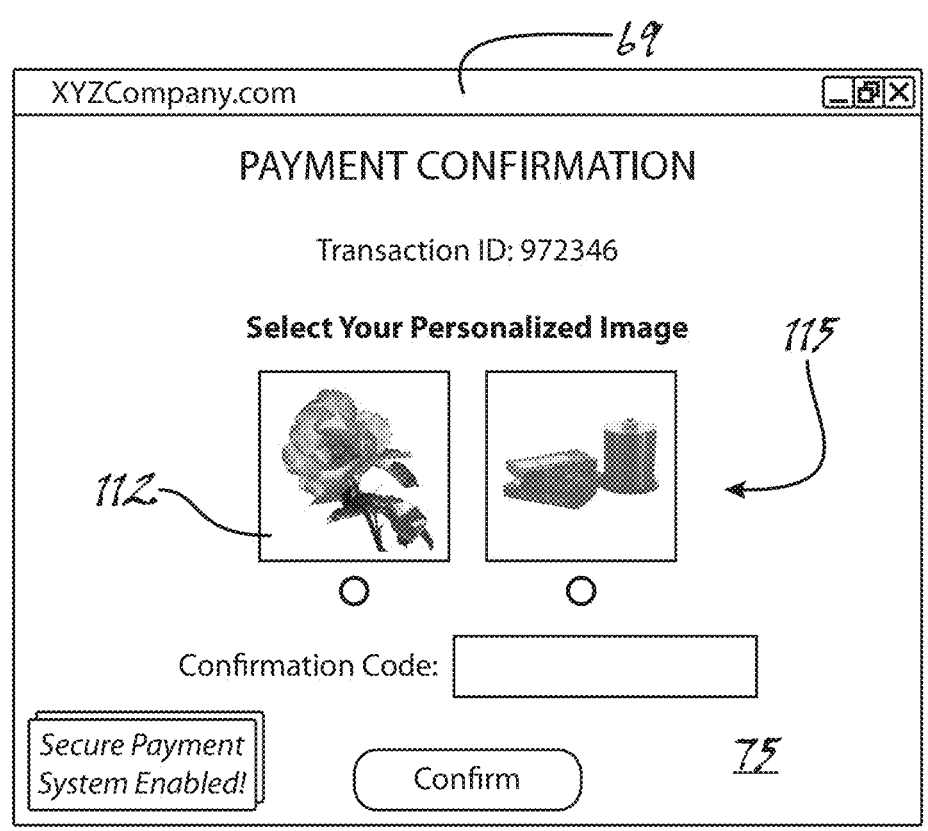
FIG. 19 shows, in a screen representation of a web browsing application, a fourth exemplary implementation of a payment confirmation page from a website showing, in particular, various details of second implementation of extended functionality for use in detecting a spoofing type deception.

Finally, as shown in FIG. 19, the consumer may be required to actually select one image 112 from a plurality of images 115 at the same time as he or she is required to enter his or her response string. In such a case, the image selection will be transmitted with the response string and will form a part of the overall response to be evaluated by the service provider 36. As will be appreciated by those of ordinary skill in the art, this embodiment serves to ensure that a careless consumer does not fail to carefully check for the required image 112.

In any case, with the response string entered, the consumer's web browser 69 submits the data to the on-line retailer's web server 66 where the hosted page processor 64 may validate the form data for technical completeness and accurate formatting. Assuming that the submitted data is technically correct or is subsequently made technically correct, the page processor 64 submits the consumer's response string to the request handler 51 hosted on the on-line retailer's application server 101 where a response message is assembled for transmission to the service provider 36. The request handler 51 will then generally queue the response message, which will include the entered response string, at the on-line retailer's service gateway device 106. If not already established, the service gateway device 106 will then undertake to establish secure communication with the corresponding client gateway device 108 at the service provider 36. Once the required secure communication is established the service gateway 106 will forward the response message through the established secure communication channel to the service provider's client gateway 108, where the nature of the response message will be identified and the response message will then be conventionally routed to the authenticator 52 hosted on the service provider's application server 50.

The authenticator 52 will then direct the validation tool 55 to evaluate the response string based upon the client reference for the response message. The validation tool 55 will access the key string table 97 of the transaction database 59 to retrieve the key string associated with the particular client reference and will evaluate the submitted response string against the retrieved key string taking into account, if appropriate for the particular implementation, the passage of time. Additionally, in a case where the selection of a particular image also forms part of the required response in addition to the response string, the validation tool 55 will also determine whether the correct image was selected by the end user 34. In any case, the validation tool 55 will then report the result of the evaluation to the authenticator 52. If the evaluation fails, the process 48 will terminate and the failure will be reported to the service client 33. If, on the other hand, the evaluation passes the authenticator 52 will determine whether a secured resource need be accessed on behalf of the on-line retailer.

If the authenticator 52 determines that a secured resource should be accessed, a resource request is formulated using the transaction parameters stored in the transaction parameter table 87 of the transaction database 59 and any additional information as may be necessary that is stored in the user database 58. For example, in the case of processing a credit card transaction, the authenticator 52 will retrieve the transaction amount from the transaction parameter table 87 of the transaction database 59 and will retrieve the full credit card number, expiration date, billing address, CV number or other necessary information pertaining to the credit card account from the resource attribute table 89 of the user database 58 and may also retrieve from the user attribute table 92 of the user database 58 necessary information concerning the on-line retailer such as, for example, the on-line retailer's banking information for deposit of obtained funds. In any case, the complete resource request is by the authenticator 52 queued to the resource gateway 109 and processed whereafter the result of the transaction is reported to the on-line retailer and also, preferably, to the consumer.

In a particularly efficient feature of the present invention, the service provider 36 may provide for the consumer an electronically generated receipt for the conducted transaction, which may be transmitted by electronic mail or otherwise. In a case where the on-line retailer or other service client 33 provides itemized or otherwise detailed purchase data, such data may be included as part of the receipt. This, of course, completely relieves the service client 33 of having to generate a receipt. Additionally, combined transaction data may be assembled by the service provider 36 for periodic bulk reporting to the service client 33. Still further, the service provider 36 may, if desired, implement a budgeting service for the end user 34, wherein at the end user's behest financial transactions over budgeted limits or over budgeted limits for particular service clients 33 or types of service clients 33 will be deemed to fail validation in order to force compliance with the terms of a budget.

Finally, it is noted that in previously describing the manner in which the authentication system 30, implemented according to the exemplary example presented, may determine an otherwise unknown unique USER_ID for the consumer from knowledge of the unique RESOURCE_ID for an identified secured resource (the credit card number in the presented example) it was stated that from the resource table 88 (holding the unique RESOURCE_ID for the credit card) the user table 85 (holding the unique USER_ID for the consumer) could be accessed through the resource user table 99. While those of ordinary skill in the art will recognize that the foregoing example use could have been carried out with an implementation omitting the intermediary resource user table 99, provision of the resource user table 99 as join table for the resource table 88 and the user table 85 establishes a many-tomany relationship between the records of the resource table 88 and the user table 85, whereby additional functionality is imparted to the authentication system 30 and method 46 of the present invention. In particular, by allowing a single secured resource to be associated with a plurality of end users 34, joint or other plural access control may be established for the secured resource.

For example, a parent of child patient presenting for treatment at a medical clinic may provide the child's Social Security Number to the clinic for use by the clinic in requesting access to the child's electronic medical records accessible by either one of two passwords held one each by two parents. In this case, the authentication system 30 implemented to provide for multiple user association with a single secured resource may simply look up each parent end user 34 associated with the child's identified medical record (secured resource) and send a separate challenge message 94 to each, storing the appropriate key strings in separate records of the key string table 97 of the transaction database 59, each record being connected by TRANSACTION_ID to the single transaction record established in the transaction table 86 of the transaction database 59 for the request for access to the child's medical record. As will be appreciated by those of ordinary skill in the art, the validation tool 55 of the authentication system 30 will evaluate a received response string against each key string associated with the transaction and will find valid a response string matching either. By way of further example, and without limitation, it should be appreciated, especially in light of this exemplary description, that this aspect of the present invention will have broad application, including for use in authorizing transactions against shared credit card or banking accounts, accessing shared on-line service accounts, deactivating an alarm system or access a computer controlled door for a home, business or other facility shared by many occupants or similar applications.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 34 that system, facility or the like for which the end user 34 desires access has implemented the teachings of the present invention. Likewise, those of ordinary skill in the art will recognize that a special program magnetic card or the like may be implemented in order to enable card swipe type initiation of a request for access. In this case, of course, the magnetic card may be encoded with an identification code for the user including no confidential or sensitive information, but preferably useful only in connection with identifying the end user 34 to an authentication system 30 implemented in accordance with the teachings of the present invention. In any case, because the scope of the present invention is much broader than any particular embodiment, the foregoing detailed description should not be construed as a limitation of the scope of the present invention, which is limited only by the claims appended hereto.

What is claimed is:

1. A method for authenticating the identity of a requester of access to a secured resource, said method for authenticating comprising the steps of:
    receiving from a service client a request for access to a secured resource, said request for access having been submitted to said service client by a requester purporting to be an authorized user of said secured resource;
    generating a challenge message with a computer server, said challenge message having a challenge string being a random string having a plurality of symbols, wherein at least one of the symbols of said challenge string is a specially designated symbol;
    communicating said challenge message through a discrete channel to said authorized user that said requester purports to be, said discrete channel being a communications channel not readily identifiable by information submitted by an end user;
    receiving from said service client a response message corresponding to said challenge message, said response message comprising a response string;
    evaluating said response message to authenticate the identity of said requester as the authorized user; and
    wherein said challenge message further comprises a copy of an image file, and further comprising the step of sending a service client image data including a publicly accessible file location for a copy of said image file.

2. The method for authenticating the identity of a requester of access to a secured resource as recited in claim 1, said method for authenticating further comprising the step of conducting for the benefit of said service client a transaction reliant upon access to said secured resource.

3. The method for authenticating the identity of a requester of access to a secured resource as recited in claim 2, said method for authenticating further comprising the steps of:
    generating a receipt for said transaction; and
    transmitting said receipt to said authorized user.

4. The method for authenticating the identity of a requester of access to a secured resource as recited in claim 2, wherein said transaction comprises providing a financial benefit.

5. The method for authenticating the identity of a requester of access to a secured resource as recited in claim 4, wherein said secured resource comprises a payment resource selected from the group consisting of:
    a credit card account;
    a banking account; and
    an automated teller machine account.

6. The method for authenticating the identity of a requester of access to a secured resource as recited in claim 4, wherein said service client comprises a vendor selected from the group consisting of:
    a retail store;
    a service station;
    an on-line service provider; and
    an on-line merchandiser.

7. The method for authenticating the identity of a requester of access to a secured resource as recited in claim 2, wherein said secured resource comprises a medical record.

8. The method for authenticating the identity of a requester of access to a secured resource as recited in claim 7, wherein said service client comprises an information consumer selected from the group consisting of:
    a healthcare provider; and
    a medical insurer.

9. The method for authenticating the identity of a requester of access to a secured resource as recited in claim 2, wherein said secured resource comprises an information product.

10. The method for authenticating the identity of a requester of access to a secured resource as recited in claim 9, wherein said information product comprises a credit data.

11. The method of claim 1 further comprising the step of establishing a test adapted to detect the existence of a spoofing type deception.

12. The method for authenticating the identity of a requester of access to a secured resource as recited in claim 11, wherein said test adapted to detect the existence of a spoofing type deception is further adapted to at least in part authenticate the identity of said requester.

13. The method for authenticating the identity of a requester of access to a secured resource as recited in claim 1, said method for authenticating further comprising the step of determining based upon passage of time whether said response string should be deemed invalid.

14. The method of claim 1 further comprising the step of removing, restricting access to replacing the said copy of said image file at said publicly accessible file location after the copy of said image has been accessed by a service client.

15. The method of claim 1 wherein said response message further comprising a user-selected image selected from a plurality of images.

16. The method of claim 1 wherein said challenge string comprises instructions instructing the requester to enter a variation of a private string associated with the authorized user.

17. The method of claim 1 wherein said evaluating step comprises the step of determining whether an image composing said response string is a copy of an image composing said challenge string.

18. The method of claim 1 wherein said evaluating step comprises retrieving a key string associated with an authorized user and evaluating the received response string against said key string.

\* \* \* \* \*